(12) United States Patent
Gniadek et al.

(10) Patent No.: US 8,465,317 B2
(45) Date of Patent: Jun. 18, 2013

(54) LATCHING CONNECTOR WITH REMOTE RELEASE

(75) Inventors: Jeffrey Gniadek, Northbridge, MA (US); Jimmy Jun-Fu Chang, Worcester, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 13/286,773

(22) Filed: Nov. 1, 2011

(65) Prior Publication Data

US 2013/0089995 A1 Apr. 11, 2013

Related U.S. Application Data

(60) Provisional application No. 61/543,419, filed on Oct. 5, 2011.

(51) Int. Cl.
*H01R 13/62* (2006.01)

(52) U.S. Cl.
USPC .......................................... 439/344; 439/352

(58) Field of Classification Search
USPC ................ 439/344, 352, 491, 160, 258, 362
See application file for complete search history.

(56) References Cited

U.S. PATENT DOCUMENTS

| | | |
|---|---|---|
| 4,762,388 A | 8/1988 | Tanaka et al. |
| 4,764,129 A | 8/1988 | Jones et al. |
| 4,840,451 A | 6/1989 | Sampson et al. |
| D323,143 S | 1/1992 | Ohkura et al. |
| 5,212,752 A | 5/1993 | Stephenson et al. |
| 5,317,663 A | 5/1994 | Beard et al. |
| 5,348,487 A | 9/1994 | Marazzi et al. |
| 5,444,806 A | 8/1995 | deMarchi et al. |
| 5,481,634 A * | 1/1996 | Anderson et al. ............... 385/76 |
| 5,506,922 A | 4/1996 | Grois et al. |
| 5,570,445 A | 10/1996 | Chou et al. |
| 5,588,079 A | 12/1996 | Tanabe et al. |
| 5,684,903 A | 11/1997 | Kyomasu et al. |
| 5,687,268 A | 11/1997 | Stephenson et al. |
| 5,937,130 A | 8/1999 | Amberg et al. |
| 5,956,444 A | 9/1999 | Duda et al. |
| 5,971,626 A | 10/1999 | Knodell et al. |
| 6,041,155 A * | 3/2000 | Anderson et al. ............. 385/139 |

(Continued)

FOREIGN PATENT DOCUMENTS

| | | |
|---|---|---|
| CN | 2836038 Y | 11/2006 |
| CN | 201383588 Y | 1/2010 |

(Continued)

OTHER PUBLICATIONS

International Search Report and Written Opinion of the International Searching Authority, Apr. 27, 2012, from Counterpart Foreign Application PT/US11/58799, Internatioal Filing Date Nov. 1, 2011.

(Continued)

*Primary Examiner* — Gary F. Paumen
(74) *Attorney, Agent, or Firm* — Pepper Hamilton LLP

(57) ABSTRACT

In one aspect the present disclosure provides a latching connector. The latching connector comprises a housing that is configured to engage with a mating connector along a coupling axis. The housing includes a lever connected to the housing. The lever is configured to selectively disengage the latching connector from the mating connector. The housing further includes an extending member connected to the lever.

49 Claims, 24 Drawing Sheets

U.S. PATENT DOCUMENTS

| | | | |
|---|---|---|---|
| RE37,080 E | 3/2001 | Stephenson et al. | |
| 6,206,577 B1 | 3/2001 | Hall, III et al. | |
| 6,206,581 B1 | 3/2001 | Driscoll et al. | |
| 6,227,717 B1* | 5/2001 | Ott et al. | 385/53 |
| 6,247,849 B1 | 6/2001 | Liu | |
| 6,461,054 B1 | 10/2002 | Iwase | |
| 6,478,472 B1* | 11/2002 | Anderson et al. | 385/53 |
| 6,551,117 B2 | 4/2003 | Poplawski et al. | |
| 6,579,014 B2 | 6/2003 | Melton et al. | |
| 6,648,520 B2 | 11/2003 | McDonald et al. | |
| 6,854,894 B1 | 2/2005 | Yunker et al. | |
| 7,090,406 B2 | 8/2006 | Melton et al. | |
| 7,090,407 B2 | 8/2006 | Melton et al. | |
| 7,091,421 B2* | 8/2006 | Kukita et al. | 174/112 |
| 7,111,990 B2 | 9/2006 | Melton et al. | |
| 7,113,679 B2 | 9/2006 | Melton et al. | |
| D533,504 S | 12/2006 | Lee | |
| D534,124 S | 12/2006 | Taguchi | |
| 7,150,567 B1 | 12/2006 | Luther et al. | |
| 7,153,041 B2 | 12/2006 | Mine et al. | |
| 7,198,409 B2 | 4/2007 | Smith et al. | |
| 7,207,724 B2 | 4/2007 | Gurreri | |
| D543,146 S | 5/2007 | Chen et al. | |
| 7,258,493 B2 | 8/2007 | Milette | |
| 7,281,859 B2 | 10/2007 | Mudd et al. | |
| D558,675 S | 1/2008 | Chien et al. | |
| 7,315,682 B1 | 1/2008 | En Lin et al. | |
| 7,325,976 B2 | 2/2008 | Gurreri et al. | |
| 7,325,980 B2 | 2/2008 | Pepe | |
| 7,329,137 B2* | 2/2008 | Martin et al. | 439/344 |
| 7,354,291 B2* | 4/2008 | Caveney et al. | 439/344 |
| 7,387,447 B2 | 6/2008 | Mudd et al. | |
| 7,390,203 B2 | 6/2008 | Murano et al. | |
| D572,661 S | 7/2008 | En Lin et al. | |
| 7,431,604 B2* | 10/2008 | Waters et al. | 439/344 |
| 7,463,803 B2 | 12/2008 | Cody et al. | |
| 7,465,180 B2* | 12/2008 | Kusuda et al. | 439/352 |
| 7,561,775 B2 | 7/2009 | Lin et al. | |
| 7,591,595 B2 | 9/2009 | Lu et al. | |
| 7,594,766 B1 | 9/2009 | Sasser et al. | |
| 7,641,398 B2 | 1/2010 | O'Riorden et al. | |
| 7,695,199 B2 | 4/2010 | Teo et al. | |
| 7,699,533 B2 | 4/2010 | Milette | |
| 7,824,113 B2 | 11/2010 | Wong et al. | |
| D641,708 S | 7/2011 | Yamauchi | |
| 8,251,733 B2* | 8/2012 | Wu | 439/352 |
| 2004/0052473 A1 | 3/2004 | Seo et al. | |
| 2004/0136657 A1 | 7/2004 | Ngo | |
| 2004/0141693 A1 | 7/2004 | Szilagyi et al. | |
| 2004/0161958 A1 | 8/2004 | Togami et al. | |
| 2006/0089049 A1 | 4/2006 | Sedor | |
| 2006/0269194 A1 | 11/2006 | Luther et al. | |
| 2007/0149062 A1 | 6/2007 | Long et al. | |
| 2007/0230874 A1 | 10/2007 | Lin | |
| 2007/0232115 A1* | 10/2007 | Burke et al. | 439/344 |
| 2007/0243749 A1* | 10/2007 | Wu | 439/352 |
| 2008/0044137 A1 | 2/2008 | Luther et al. | |
| 2008/0069501 A1 | 3/2008 | Mudd et al. | |
| 2008/0101757 A1 | 5/2008 | Lin et al. | |
| 2008/0226237 A1 | 9/2008 | O'Riorden et al. | |
| 2008/0267566 A1 | 10/2008 | Lin | |
| 2009/0028507 A1 | 1/2009 | Jones et al. | |
| 2009/0214162 A1 | 8/2009 | O'Riorden et al. | |
| 2009/0220197 A1 | 9/2009 | Gniadek et al. | |
| 2010/0034502 A1 | 2/2010 | Lu et al. | |
| 2010/0322561 A1 | 12/2010 | Lin et al. | |
| 2011/0044588 A1* | 2/2011 | Larson et al. | 385/81 |
| 2011/0131801 A1 | 6/2011 | Nelson et al. | |
| 2011/0177710 A1* | 7/2011 | Tobey | 439/345 |

FOREIGN PATENT DOCUMENTS

| | | |
|---|---|---|
| DE | 202006011910 U1 | 3/2007 |
| DE | 102006019335 A1 | 10/2007 |
| EP | 1074868 A1 | 7/2001 |
| EP | 1566674 A1 | 8/2005 |
| JP | 2009229545 | 10/2009 |
| JP | 2009276493 A | 11/2009 |
| WO | WO 01/79904 A2 | 10/2001 |
| WO | WO 2008/112986 A1 | 9/2008 |
| WO | 2009135787 A1 | 11/2009 |

OTHER PUBLICATIONS

"Fiber Optic Connectors and Assemblies Catatog," 2009, Huber & Suhner Fiber Optics, Herisau, Switzerland; http://www.google.co.in/uri?sa=t&source=web&cd=63&ved=0CCMQFjACODw&url=http%3A%2F%2Fwww.hubersuhner.com%2Fwrite_rtn_binary.pdf%3Fbinaryid%3D8DBC7DE2EB72D315%26binarytype%3D48403DAA363AEB7E&ei=ZvcvTujWH4ntrAfH-dXZCg&usg=AFQjCNE1MdC-4avewRJU6lDVctlWYbr0QQ.

"Fiber Optic Interconnect Solutions, Tactical Fiber Optic Connectors, Cables and Termini," 2006, Glenair, Inc., Glendale, California. http://www.mps-etectronics.de/fileadmin/files/MPS-E/Produkte/Kataloge/Glenair/Katalog_Glenair_LWL_1110.pdf.

"Fiber Optic Products Catalog." Nov. 2007, Tyco Electronics Corporation, Harrisburg, Pennsylvania, http://www.ampnetconnect.com/documents/Fiber%20Optics%20Catalog%201107.pdf.

International Search Report and Written Opinion dated Aug. 27, 2012 for PCT/US2012/039126.

\* cited by examiner

SECTION VIEW OF 150

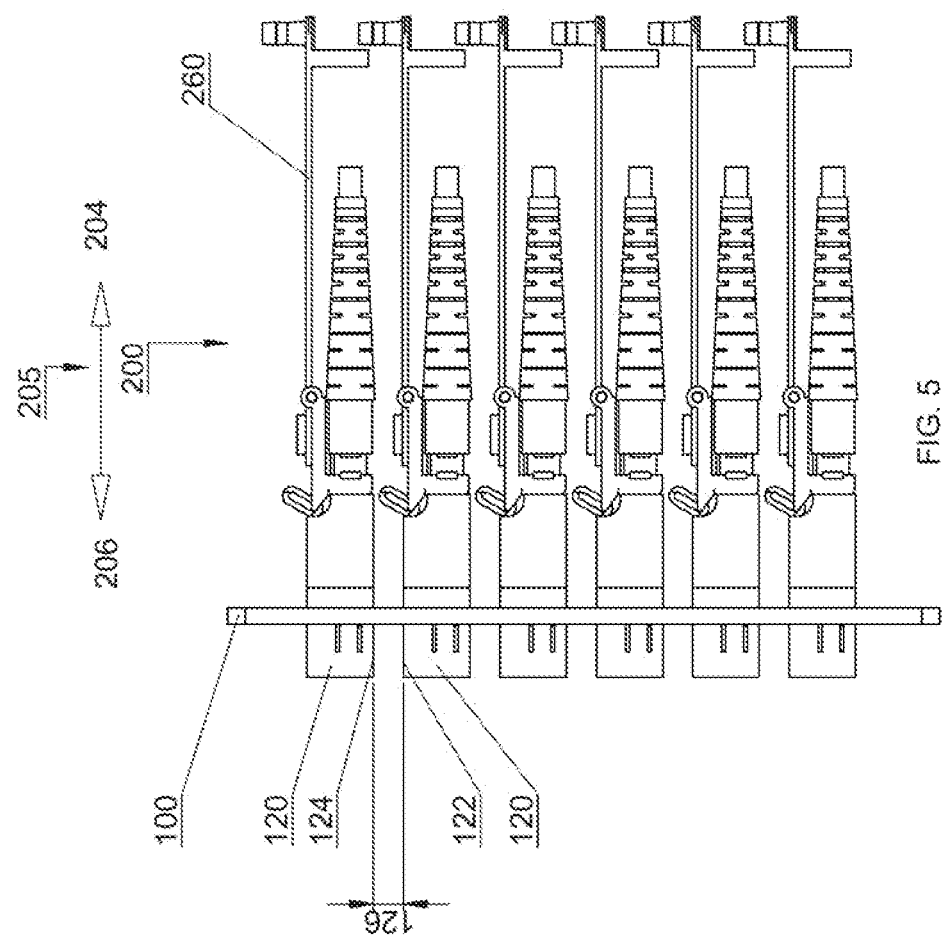

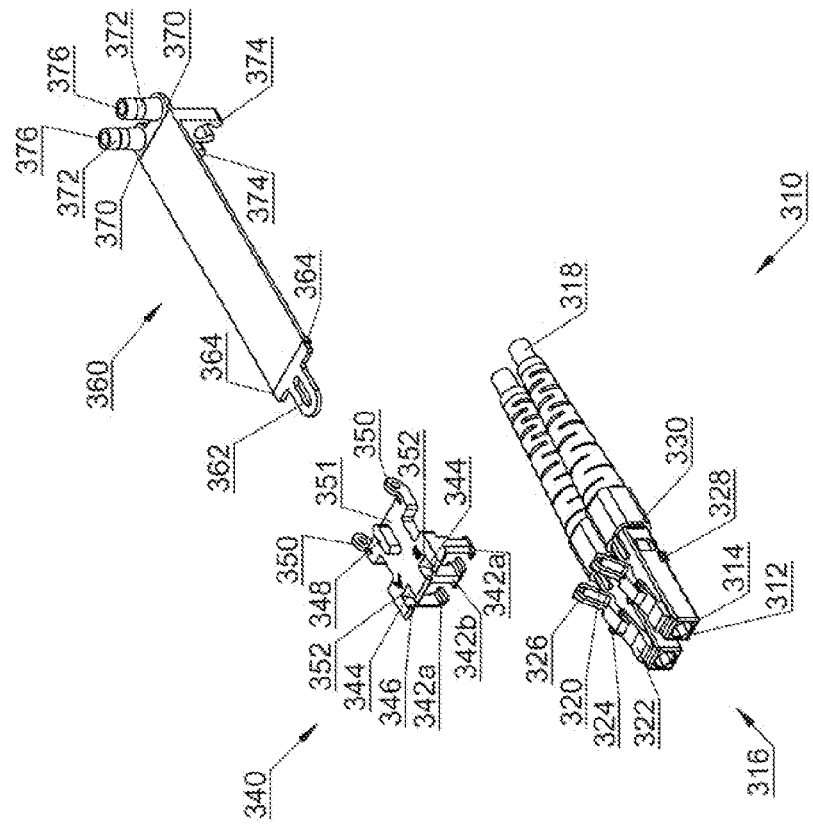
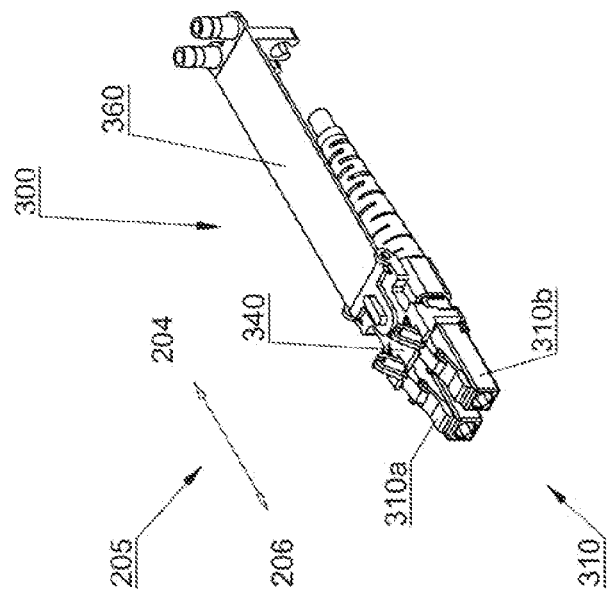
FIG. 6B

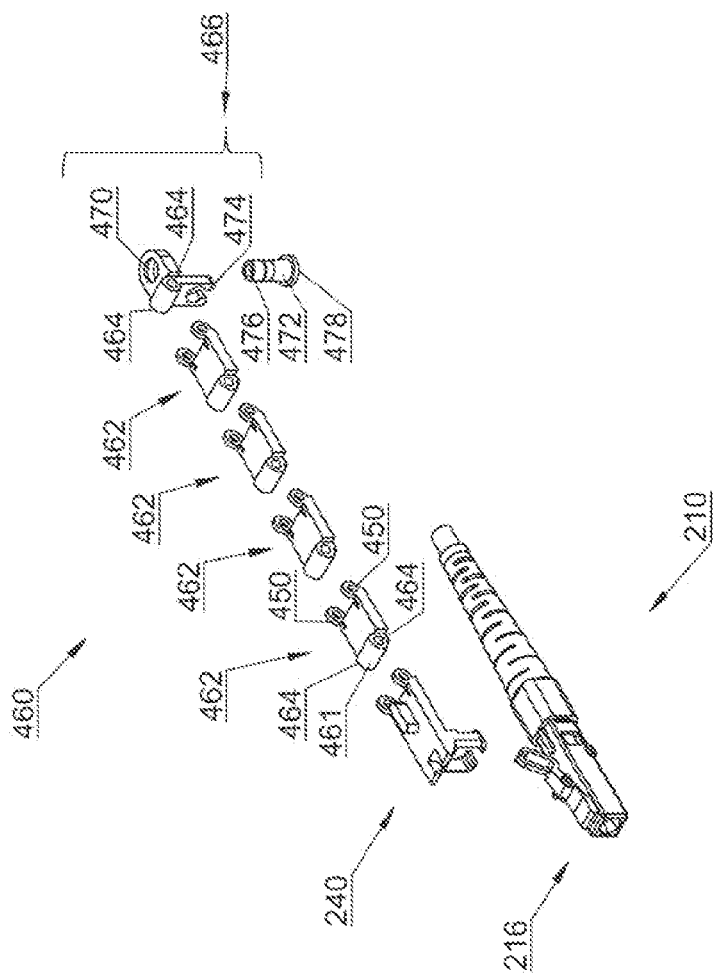

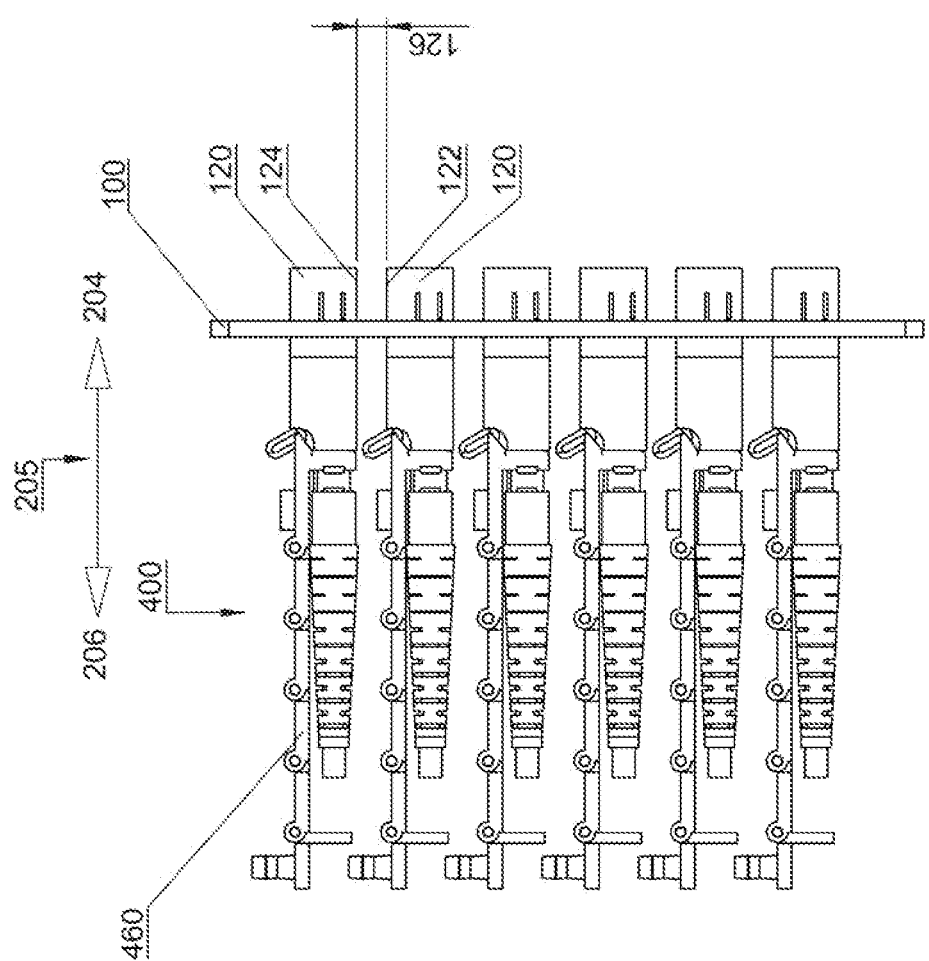

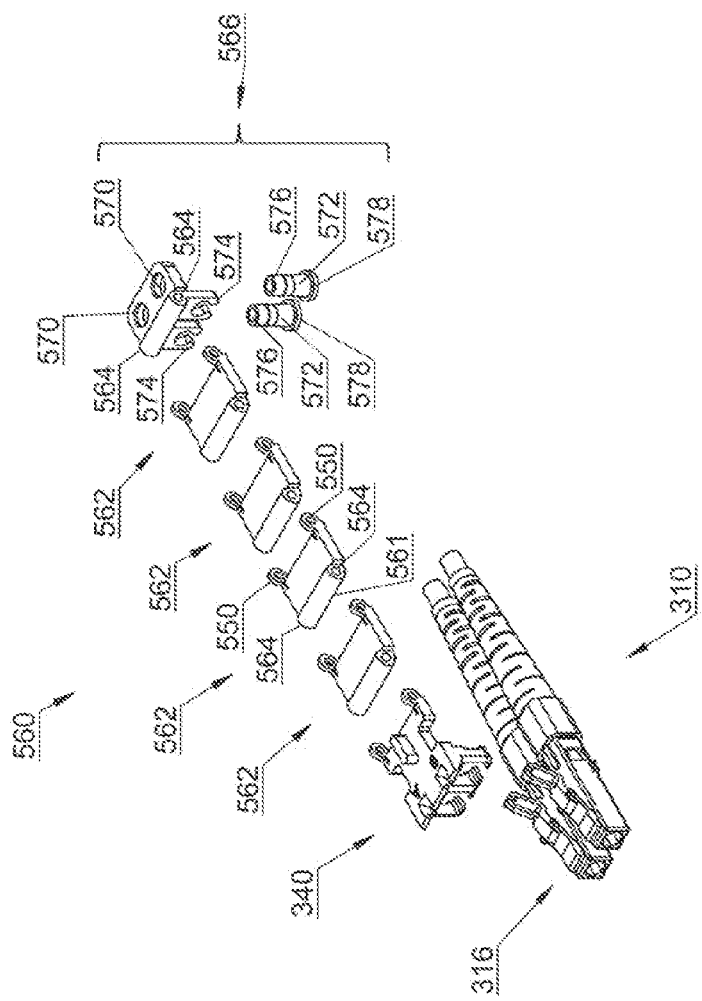
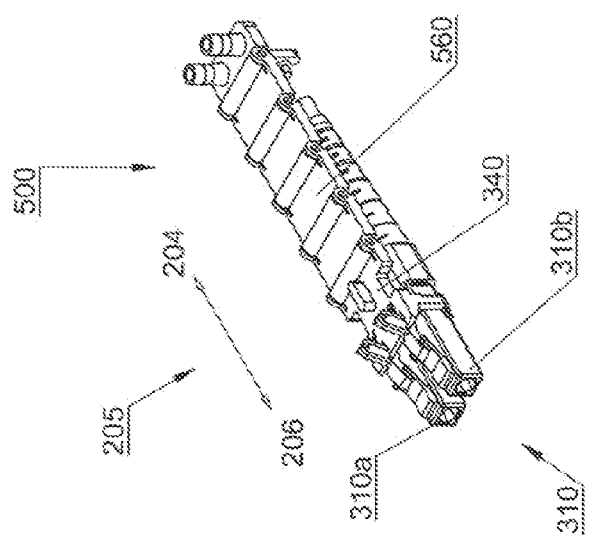

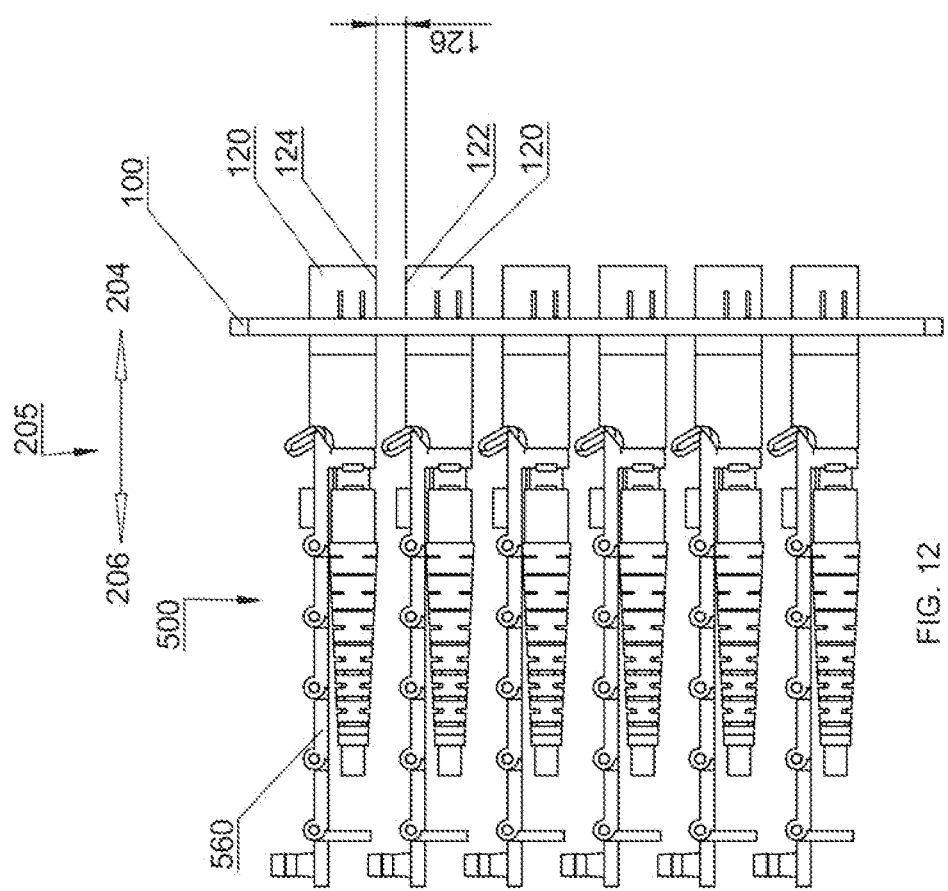

SECTION VIEW OF 800

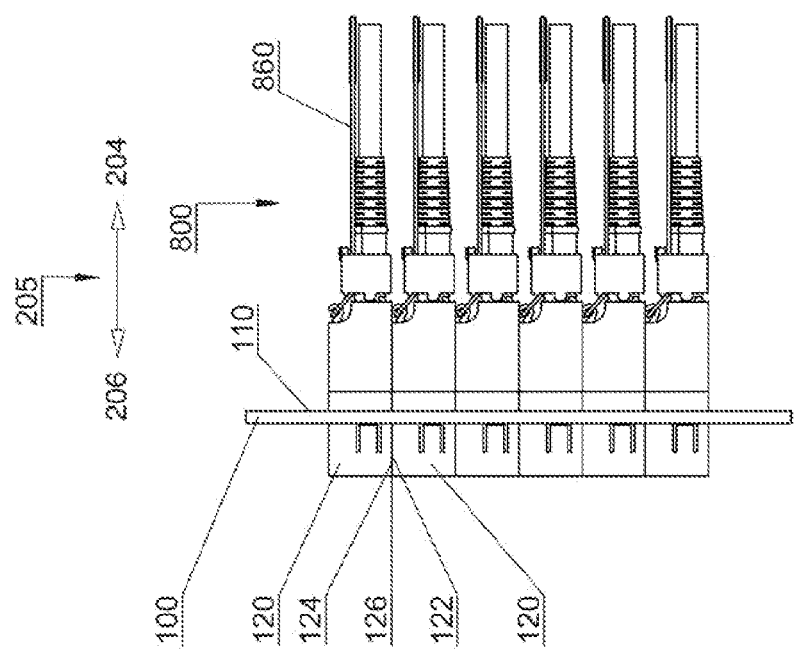

LATCHING CONNECTOR WITH REMOTE RELEASE

CLAIM OF PRIORITY

This application claims the benefit of priority to U.S. Provisional Application No. 61/543,419 filed on Oct. 5, 2011 and entitled "Remote Release of Latching Connector," which is incorporated by reference herein in its entirety.

BACKGROUND

The present disclosure relates to interconnect technology. More specifically, the present disclosure relates to interconnect technology used in electrical and optical systems.

Recently, there has been unprecedented growth in communication networks. In such highly competitive markets, network providers continuously struggle to find better ways to improve the quality of service at a lower cost.

One way in which network providers have tried to improve the quality of service while reducing cost has been to deploy high density interconnect panels. Data, voice, and other communication networks are increasingly using interconnect to carry information. High-density panels are designed to consolidate the increasing volume of interconnections necessary to support the fast-growing networks into a compacted form factor, thereby increasing quality of service and decreasing costs such as floor space and support overhead. However, the deployment of high-density interconnect panels has not fully realized the stated goals.

In communication networks, such as data centers and switching networks, numerous interconnections between mating connectors are compacted into high-density panels. Panel and connector manufacturers optimize for such high densities by shrinking the connector size and/or the spacing between adjacent connectors on the panel. While both approaches are effective ways by which to increase the panel connector density, shrinking the connector size and/or spacing increases the support cost and diminishes the quality of service.

A cable is generally constructed using a transmission medium such as an optical fiber or an electrical conductor. An electrical conductor is generally a copper wire configured to carry electrical power. An optical fiber is generally a glass fiber configured to carry light. Individual cables may be grouped into a line capable of carrying large amounts of data simultaneously. When constructing a communication network, a cable assembly typically includes a jacket to protect the underlying cable, and terminating connectors at each end of the cable. These terminating connectors may be used to optically and/or electrically couple a first cable assembly to a mating connector of a second cable assembly.

A typical connector may include a latching mechanism adapted to lock the engagement of a latching connector with a mating connector, and a release mechanism adapted to disengage the first latching connector from the mating connector. In the engaged configuration, an operator may disengage the engaged connectors by applying a vertical force upon the release mechanism by squeezing the release mechanism between the operator's thumb and forefinger.

In a high-density panel configuration, adjacent connectors and cable assemblies obstruct access to the individual release mechanisms. This physical obstruction impedes the ability for the operator to minimize the stresses applied to the cables and connectors. For example, these stresses may be applied when the user reaches into a dense group of connectors and pushes aside surrounding optical fibers and connectors to access an individual connector release mechanism with the thumb and forefinger. Overstressing the cables and connectors may introduce latent defects, compromise the integrity and/or reliability of the terminations, and potentially cause serious disruptions to the network performance.

While an operator may attempt to use a tool, such as a screwdriver, to reach into the dense group of connectors, and activate the release mechanism, the adjacent cables and connectors can obstruct the operator's line of sight, making it difficult to guide the tool to the release mechanism without pushing aside the surrounding cables. Moreover, even when the operator has a clear line of sight, guiding the tool to the release mechanism is a time consuming process. Therefore using a tool is not effective at reducing support time and increasing the quality of service.

Quality of service and support time is further disadvantaged by exposure of the cable termination to the surrounding environment, and vulnerability of being scratched, chipped, cracked, or otherwise damaged by dust particles, grease, contaminants, and other foreign objects when the operator disengages the release mechanism. Such damage to the cable may potentially cause serious disruption to the network performance. While dust covers may be used to prevent such damage, small and loose hardware, such as dust covers, bears the tendency to become lost, misplaced, or otherwise not easily accessible to the operator when it is needed.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this document is to be construed as an admission that the embodiments described in this document are not entitled to antedate such disclosure by virtue of prior invention. As used in this document, the term "comprising" means "including, but not limited to."

In one aspect the present disclosure provides a latching connector. The latching connector comprises a housing that is configured to engage with a mating connector along a coupling axis. The housing includes a lever connected to the housing. The lever is configured to selectively disengage the latching connector from the mating connector. The housing further includes an extending member connected to the lever.

In some designs the extending member can comprise a hook or a loop. In other designs the latching connector can comprise a multi-port connector. In various designs, the mating connector can be configured to engage with an LC connector.

In another aspect, the present disclosure provides an adaptive release member. The adaptive release member includes a release configured to receive a first force that is opposite to a latching connector coupling direction, and to disengage the latching connector from the mating connector by transmitting a component of the first force to the latching connector. The latching connector includes a housing configured to engage with a mating connector along the coupling direction. The housing itself includes a lever connected to the housing. The lever configured to selectively disengage the latching connector from the mating connector. The housing also includes an extending member connected to the lever and configured to cooperate with the release to actuate the lever. The latching connector also includes a guide connected to the release and configured to cooperate with the latching connector to restrict the release range of motion. In some designs, the latching connector can comprise a multi-port latching connector.

In a further aspect, the present disclosure provides an extender comprising an actuator configured to receive a first force that is opposite to a latching connector coupling direction, and to disengage the latching connector from the mating connector by transmitting a component of the first force to the latching connector. In this design, the latching connector comprises a housing configured to engage with a mating connector along the coupling direction. The housing includes a lever connected to the housing and configured to selectively disengage the latching connector from the mating connector. The housing further includes an extending member connected to the lever and configured to cooperate with the actuator to actuate the lever.

In some designs, the extender can include an actuator which comprises a hook or a loop. In other designs, the extender can further include a plurality of ridges and grooves disposed along a length of the extender. In one design, the extender can further include a dust cover attached to the extender and configured to protect a transmission medium. Optionally, the extender can include a jacket clamp attached to the extender. In another design, the extender can include a link that is connected to the actuator and configured to adjust a length of the extender. The extender can also include an identification tag connected to the extender.

In another aspect, the present disclosure provides an extender comprising an actuator configured to receive a first force that is opposite to a latching connector coupling direction, and to transmit a component of the first force to an adaptive release member. The adaptive release member includes a release configured to receive a component of the first force and to disengage the latching connector from the mating connector by transmitting a second force to the latching connector.

In this design, the latching connector comprises a housing configured to engage with a mating connector along the coupling direction. The housing includes a lever connected to the housing and configured to selectively disengage the latching connector from the mating connector. The housing also includes an extending member connected to the lever and configured to cooperate with the release to actuate the lever. The latching connector also includes a guide connected to the release and configured to cooperate with the latching connector to restrict the release range of motion.

In one design, the extender can optionally include a plurality of ridges and grooves disposed along a length of the extender. In another design, a link can be connected to the actuator and configured to adjust a length of the extender. Optionally, a dust cover can be attached to the extender and configured to protect a transmission medium. The extender can further include a jacket clamp attached to the extender. The extender can also include an identification tag connected to the extender.

In a further aspect, the present disclosure provides a cable assembly comprising a jacket. The cable assembly further comprises a latching connector, itself comprising a housing configured to engage with a mating connector along a coupling direction. The latching connector includes a lever connected to the housing and configured to selectively disengage the latching connector from the mating connector. The latching connector also includes an extending member connected to the lever. The cable assembly further comprises a transmission medium disposed within the jacket and the housing.

In one design, the cable assembly can include an extender, itself including an actuator configured to receive a first force that is opposite to a latching connector coupling direction, and to disengage the latching connector from a mating connector by transmitting a component of the first force to the extending member. In this design, a guide is positioned on the latching connector and configured to restrict the extender range of motion. The extender can further include a plurality of ridges and grooves disposed along a length of the extender. In one design, the extender can include a dust cover attached to the extender and configured to protect the transmission medium. In another design, the extender can include a jacket clamp attached to the extender. Optionally, a link can be connected to the actuator and configured to adjust a length of the extender. The extending member can comprise a hook, and the actuator can comprise a loop configured to cooperate with the hook. The cable assembly can further include an identification tag connected to the extender. In one design, the guide can comprise a boot including a strain relief that is configured to protect the transmission medium. Optionally, a restoring member can be connected to the boot, and can be configured to cooperate with a stop, itself connected to the extender, to restore the position of the lever to a natural position.

In another design, the cable assembly can further comprise an adaptive release member. The adaptive release member includes a release configured to receive a first force that is opposite to a latching connector coupling direction, and to disengage the latching connector from the mating connector by transmitting a component of the first force to the extending member. The adaptive release member also includes a guide connected to the release and configured to cooperate with the latching connector to restrict the release range of motion.

In this design, the cable assembly can further include an extender. The extender includes an actuator configured to receive a second force that is opposite to a latching connector coupling direction, and to disengage the latching connector from the mating connector by transmitting a component of the second force to the release. The extender can further include a plurality of ridges and grooves disposed along a length of the extender. In one design, the extender can include a dust cover attached to the extender and configured to protect the transmission medium. In another design, the extender can include a jacket clamp attached to the extender. Optionally, a link can be connected to the actuator and configured to adjust a length of the extender. The extending member in this design can optionally comprise a loop, and the release can comprise a hook that is configured to cooperate with the loop. The cable assembly can further include an identification tag connected to the extender.

In another aspect, the present disclosure provides a high-density panel, itself including a panel including a mounting surface. The high density panel further includes a first mating connector disposed on the mounting surface and having a first edge and a second mating connector disposed on the mounting surface and having a second edge. The distance between the first edge and the second edge is less than 1.25 millimeters. In one design, the distance between the first edge and the second edge is greater than or equal to 0 millimeters. Optionally, the first edge can abut the second edge. The panel can optionally comprise a printed circuit board. In one design, the first and second mating connectors are each configured to engage with a LC connector.

In a further aspect, the present disclosure provides a method of extracting a latching cable assembly from a panel.

This method comprises applying a force to an extender along a coupling axis of a latching connector in a direction opposite to a coupling direction of the latching connector and increasing the force applied to the extender until the latching connector disengages from a mating connector.

These and other features of the invention are described in detail below.

BRIEF DESCRIPTION OF THE DRAWINGS

FIG. 5 is a perspective view depicting the engagement of an array of cable assemblies.

FIG. 6A is an isometric view of a multi-port cable assembly for interconnection on a high density mating connector panel.

FIG. 6B is an exploded view of the cable assembly of FIG. 6A.

FIG. 9A is an isometric view of a cable assembly for interconnection on a high density mating connector panel.

FIG. 9B is an exploded view of the cable assembly of FIG. 9A.

FIG. 10 is a perspective view depicting the engagement of an array of cable assemblies.

FIG. 11A is an isometric view of a multi-port cable assembly for interconnection on a high density mating connector panel.

FIG. 11B is an exploded view of the multi-port cable assembly of FIG. 11A.

FIG. 12 is a perspective view depicting the engagement of an array of multi-port cable assemblies.

FIG. 24 is a perspective view depicting the stackability of the couplers of FIG. 3A.

DETAILED DESCRIPTION

Figure 1:
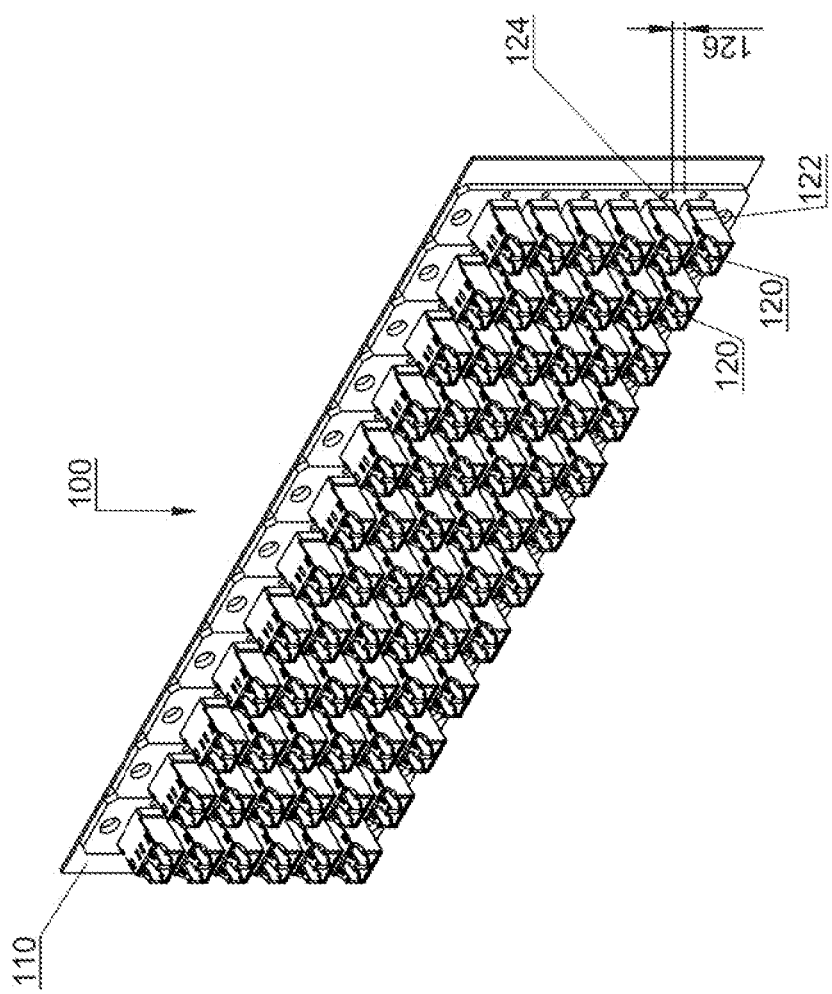
FIG. 1 is a high density panel including a plurality of couplers.

Referring to FIG. 1, a high density panel 100 includes a mounting surface 110. The panel 100 can include a printed circuit board. A plurality of couplers 120, are disposed on the mounting surface 110, and are arranged generally in close proximity to one another in a plurality of rows and columns. Each coupler 120 has a first edge 122 and a second edge 124. The density of the panel 100 can be increased by decreasing the distance 126 between the first edge 122 of a first coupler 120 and the second edge 124 of a second coupler 120. The couplers 120 are configured to accept connectors that will be shown and described below. The couplers 120 can also be configured to engage with a LC connector.

Figure 2B:
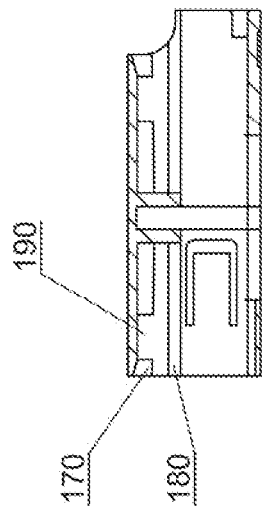
FIG. 2B is a side view depicting the sidewall of the mating connectors of FIG. 2A.
Figure 2A:
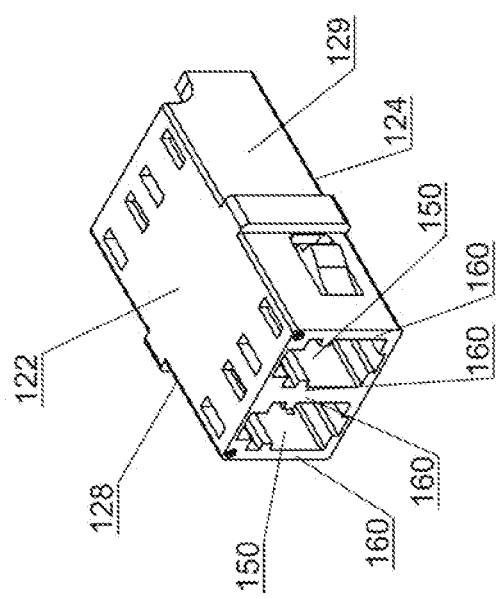
FIG. 2A is a coupler including mating connectors.

Referring also to FIGS. 2A and 2B, the coupler 120 can generally include mating connectors 150. Each mating connector 150 includes symmetrical sidewalls 160. Each sidewall 160 is attached to and includes a top rail 170, a bottom rail 180, and a trap 190. The top rail 170 and the bottom rail 180 protrude from the inner surface of the sidewall 160.

Each mating connector 150 or coupler 120 may comprise any type and form of shape, design and/or dimensions. In some designs, the mating connector 150 or the coupler 120 may comprise conical, circular, tube-like, square-like, spherical or rectangular components or shapes. The mating connectors 150 or the couplers 120 may include any number of components of each of these shapes which may be integrated and interfaced into the connector. In some designs, the mating connectors 150 or the couplers 120 may interface or latch with a latching connector along a length dimension which may be parallel with the actual optical fiber or electrical conductor running through the mating connector 150 or the couplers 120. The mating connectors 150 or the couplers 120 may also include a width and a height orthogonal to the length, where the width and length are orthogonal to each other.

Regardless of the shape of the mating connectors 150 or the couplers 120, which may vary based on the design, the width and the height of a coupler 120 may be any length between 0.01 millimeter and 10 centimeters, such as a length between 1 mm and 5 mm. In some designs, the width of a mating connector 150 coupler 120 may be any size, such as 0.01 millimeters, 0.05 millimeters, 0.1 millimeters, 0.5 millimeters, 1 millimeter, 1.5 millimeters, 2 millimeters, 2.5 millimeters, 3 millimeters, 3.5 millimeters, 4.0 millimeters, 4.5 millimeters, 5.0 millimeters, 5.5 millimeters, 6.0 millimeters, 6.5 millimeters, 7.0 millimeters, 7.5 millimeters, 8.0 millimeters, 8.5 millimeters, 9.0 millimeters, 9.5 millimeters, 10 millimeters, 12 millimeters, 15 millimeters, 18 millimeters, 25 millimeters, 50 millimeters or 100 millimeters. In further designs, the height of a mating connector 150 may be any size, such as 0.01 millimeters, 0.05 millimeters, 0.1 millimeters, 0.5 millimeters, 1 millimeter, 1.5 millimeters, 2 millimeters, 2.5 millimeters, 3 millimeters, 3.5 millimeters, 4.0 millimeters, 4.5 millimeters, 5.0 millimeters, 5.5 millimeters, 6.0 millimeters, 6.5 millimeters, 7.0 millimeters, 7.5 millimeters, 8.0 millimeters, 8.5 millimeters, 9.0 millimeters, 9.5 millimeters, 10 millimeters, 12 millimeters, 15 millimeters, 18 millimeters, 25 millimeters, 50 millimeters or 100 millimeters.

In some designs, a high-density panel of mating connectors 150 or couplers 120 may include a plurality of mating connectors 150 or couplers 120 arranged into an array or rows of and columns. The rows and columns may be parallel and perpendicular to each other, or may be shifted to be non-parallel or arranged in any other orderly or disorderly manner.

In one design, a panel 100 comprises a set of 30 mating connectors 150 or couplers 120, arranged in 6 columns and 5 rows. The distance between each of the mating connectors 150 or the couplers 120 in the panel 100 along the width of the panel 100 may be an distance between 0 and 30 millimeters, such as 0.001 millimeters, 0.005 millimeters, 0.01 millimeters, 0.03 millimeters, 0.05 millimeters, 0.08 millimeters, 0.1 millimeters, 0.25 millimeters, 0.5 millimeters, 0.75 millimeters, 0.90 millimeters, 1 millimeter, 1.1 millimeters, 1.2 millimeters, 1.3 millimeters, 1.4 millimeters, 1.5 millimeters, 1.6 millimeters, 1.8 millimeters, 2 millimeters, 2.5 millimeters, 5 millimeters, 10 millimeters or any other distance. In some designs, the distance between each of the mating connectors 150 or the couplers 120 in the panel 100 along the height of the panel 100 may be any distance between 0 and 30 millimeters, such as 0.001 millimeters, 0.005 millimeters, 0.01 millimeters, 0.03 millimeters, 0.05 millimeters, 0.08 millimeters, 0.1 millimeters, 0.25 millimeters, 0.5 millimeters, 0.75 millimeters, 0.90 millimeters, 1 millimeter, 1.1 millimeters, 1.2 millimeters, 1.3 millimeters, 1.4 millimeters, 1.5 millimeters, 1.6 millimeters, 1.8 millimeters, 2 millimeters, 2.5 millimeters, 5 millimeters, 10 millimeters or any other distance.

In another design, a panel 100 comprises a set of 30 mating connectors 150 or couplers 120, arranged in non-parallel and/or non-perpendicular manner. The distance between each of the mating connectors 150 or the couplers 120 in the panel along the width of the panel 100 may be any distance between 0 and 30 millimeters, such as 0.001 millimeters, 0.005 millimeters, 0.01 millimeters, 0.03 millimeters, 0.05 millimeters, 0.08 millimeters, 0.1 millimeters, 0.25 millimeters, 0.5 millimeters, 0.75 millimeters, 0.90 millimeters, 1 millimeter, 1.1 millimeter, 1.2 millimeters, 1.3 millimeters, 1.4 millimeters, 1.5 millimeters, 1.6 millimeters, 1.8 millimeters, 2 millimeters, 2.5 millimeters, 5 millimeters, 10 millimeters or any other distance. In some designs, the distance between each of the mating connectors 150 or the couplers 120 in the panel along the height of the panel may be any distance between 0 and 30 millimeters, such as 0.001 millimeters, 0.005 millimeters, 0.01 millimeters, 0.03 millimeters, 0.05 millimeters, 0.08 millimeters, 0.1 millimeters, 0.25 millimeters, 0.5 millimeters, 0.75 millimeters, 0.90 millimeters, 1 millimeter, 1.1 millimeters, 1.2 millimeters, 1.3 millimeters, 1.4 millimeters, 1.5 millimeters, 1.6 millimeters, 1.8 millimeters, 2 millimeters, 2.5 millimeters, 5 millimeters, 10 millimeters or any other distance.

It should thus be clear that the dimensions of the mating connectors 150 or the couplers 120, as well as the distances in a panel 100, on each side of the mating connector 150 or coupler 150, may vary dependent on the design.

Figure 3B:
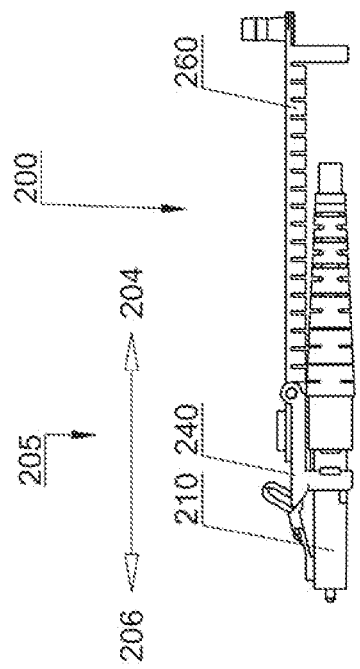
FIG. 3B is a perspective view of a cable assembly for interconnection on a high density mating connector panel.
Figure 3A:
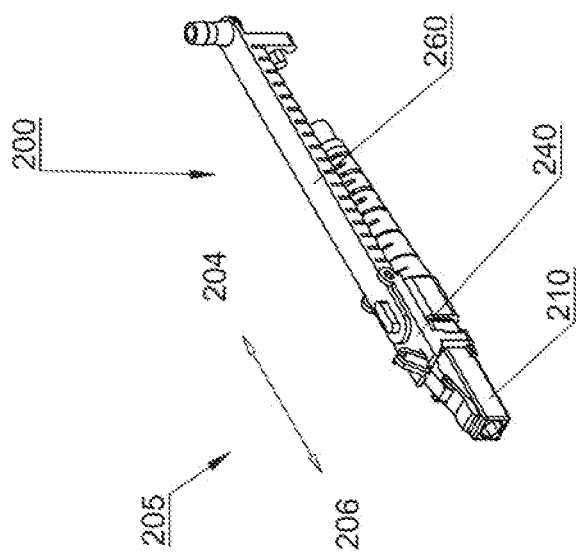
FIG. 3A is an isometric view of a cable assembly for interconnection on a high density mating connector panel.

Referring to FIGS. 3A and 3B, a push-pull cable assembly 200 is configured to connect to the mating connector 150. The push-pull cable assembly 200 generally includes a cable assembly 210, an adaptive release member 240, and an extender 260.

Figure 4:
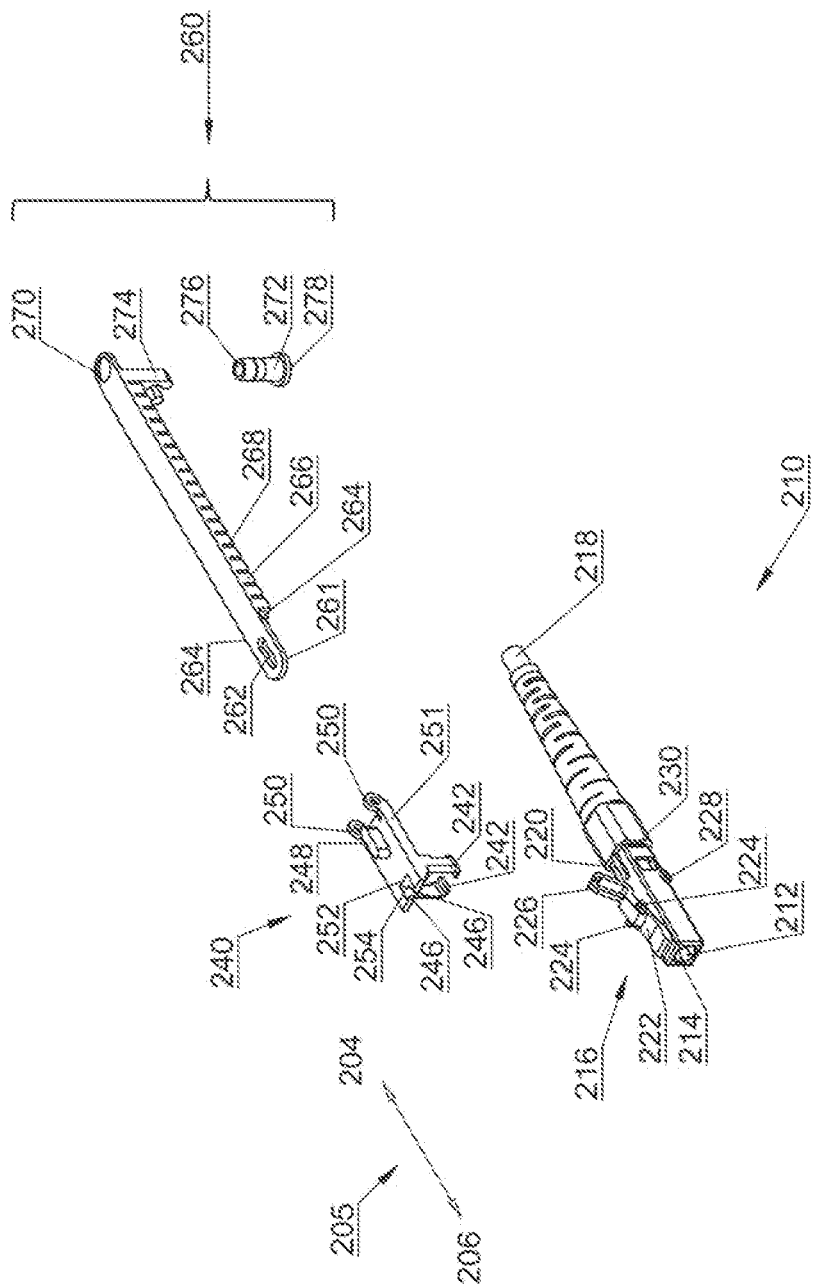
FIG. 4 is an exploded view of the cable assembly of FIG. 3A.
Figure 7:
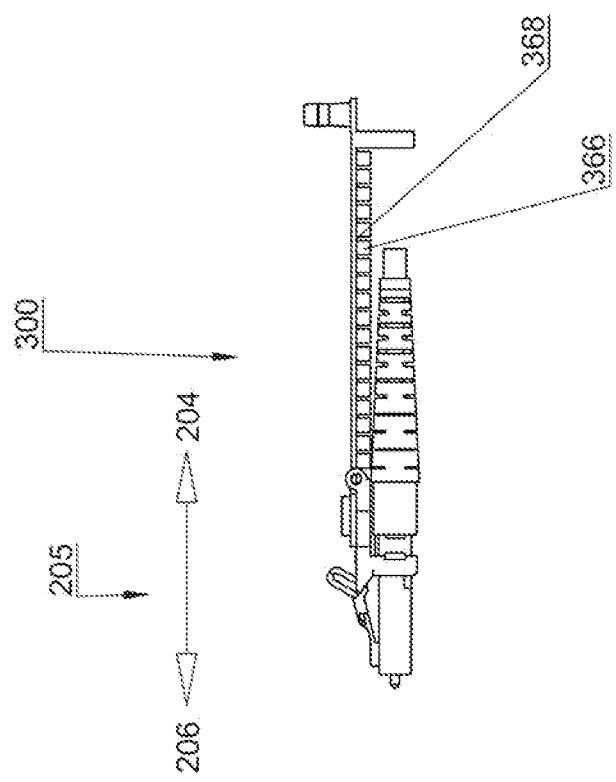
FIG. 7 is a perspective view of the multi-port cable assembly of FIG. 6A.

Referring also to FIG. 4, the cable assembly connector 210 includes a latching connector 216, a transmission medium 212, and a jacket 218. The latching connector 216 includes an outer housing 220, an inner housing 214, a lever 222, front stops 228, and rear stops 230. The transmission medium 212 is concentrically disposed within the inner housing 214 and the jacket 218. The transmission medium 212 can comprise an optical fiber or an electrical conductor. A first end of the lever 222 is attached to the outer housing 220. A second end of the lever 222 is not attached to the outer housing 220. The lever includes latches 224 and an extending member 226 for extending the lever 222. The latches 224 are symmetrically attached to and protrude from both sides of the lever 222. The extending member 226 is attached to the second end of the lever 222, and comprises a loop. Front stops 228 and rear stops 230 are attached to and protrude from the outer housing 220, and are symmetrically disposed along both sides of the outer housing 220.

The adaptive release member 240 includes and is attached to guides 242, a release 252, a tab 248, and snap bearings 250. Each guide 242 is symmetrically disposed on the adaptive release member 240, protruding downwardly from the adaptive release member 240 bottom surface for a length that is approximately equal to the height of the outer housing 220, and curves inwardly towards the center of the adaptive release member 240. The release 252 includes a lever space 244. The lever space 244 is generally sufficiently wide enough to accommodate the width of the extending member 226. The release 252 also includes and is attached to symmetrical release members 246. Each of the release members 246 protrude inwardly into the lever space 244, collectively forming a channel that is narrower than the width of the extending member 226. The tab 248 protrudes from the top surface of the adaptive release member 240. The snap bearings 250 are symmetrically disposed on both sides of the adaptive release member 240.

The extender 260 includes and is attached to an actuator 261, ridges 266, a jacket clamp 274, and a dust cover 272. The actuator 261 includes snaps 264 and a slot 262. The slot is sized to cooperate with the tab 248. The snaps 264 protrude symmetrically on each side of the extender 260 and are sized to cooperate with the snap bearings 250. Each ridge 266 protrudes downwardly from the bottom side of the extender 260. A groove 268 is disposed between each pair of successive ridges 266. The dust cover bearing 270 is appropriately sized to cooperate with the dust cover 272. The dust cover 272 has an outer diameter that is appropriately sized to fit inside the housing inner surface 214, and includes a cavity 276 which is appropriately sized to accommodate the diameter of the transmission medium 212. The dust cover 272 base is attached to a pair of lips 278. The lips 278 protrude outwardly along the circumference of the dust cover 272. The lips 278 are spaced to cooperate with the dust cover bearing 270 thickness. The jacket clamp 274 is sized to accommodate the diameter of the jacket 218.

The inner and outer housings 214 and 220 are configured to engage with a mating connector 150 along a coupling direction 206. The transmission medium 212 acts as a conduit to carry a signal over a distance spanning the length of the transmission medium 212. The jacket 218 protects the transmission medium 212 from damage during operation. The lever 222 is configured to receive a force in a direction normal to the top of the outer housing 220 and to transmit a proportionate force acting in the same direction to the latches 224, thereby selectively disengaging the latching connector 216 from the mating connector 150.

The adaptive release member 240 is configured to receive a force opposite to the coupling direction 206, and to disengage the latching connector 216 from the mating connector 150 by transmitting a component of the received force to the latching connector 216. The release members 246 are configured to cooperate with the extending members 226 to compress the lever 222. The lever space 244 is configured to provide a resting space for the lever 222. The guides 242 cooperate with the outer housing 220, front stops 228 and rear stops 230 in order to restrict the release 252 range of motion to the coupling axis 205 of the latching connector 216 and to further restrict the adaptive release member 240 range of motion to the space between front stops 228 and the rear stops 230. The tab 248 and the snap bearings 250 mechanically couple with corresponding structures of the slot 262 and the snaps 264. The snap bearings 250 cooperate with the snaps 264 to provide freedom for the extender 260 to move in the direction normal to the coupling axis 205.

While the extending member 226 comprises a loop in this particular design, it should be understood that the extending member 226 can comprise any other shape which cooperates the release 252 to compress of the lever 222.

The extender 260 includes an actuator 261 that is configured to receive a force that is opposite to the coupling direction 206, and to transmit a component of the received force to the adaptive release member 240. The ridges 266 and the grooves 268 provide enhanced flexibility along the length of the extender 260. The jacket clamp 274 is configured to clamp the jacket 218 and to prevent the extender 260 from dangling. The dust cover bearing 270 receives and holds the dust cover 272 in place. The dust cover 272 plugs the cavity between the transmission medium 212 and the housing inner surface 214, thus protecting the transmission medium 212 when it is not in use.

Referring again to FIGS. 2A and 2B, the mating connector 150 receives the latching connector 216 of the cable assembly 200. An operator may engage the latching connector 216 with the mating connector 150 by guiding the leading edge of the latching connector 216 into the mating connector 150 and applying a force in the coupling direction 206. The operator applied force in turn causes the top inner surface of the mating connector 150 to compress the lever 222, and thereby align the leading edge of each latch 224 between the respective top rail 170 and bottom rail 180. When the trailing edge of each latch 224 then crosses the interface between the respective top rail 170 and bottom rail 180, each latch 224 becomes sandwiched in between the respective top rail 170 and bottom rail 180 thereby maintaining the lever 222 in the compressed position. When the trailing edge of each latch 224 crosses into the respective trap 190, the lever 222 becomes decompressed, thereby trapping the lever 222 in the traps 190. In this trapped position, the latching connector 216 is said to be engaged with the mating connector 150.

The cable assembly 200 is disengaged from the mating connector 150 by applying a force that is opposite to the coupling direction 206, to the extender 260 until the latching connector 216 disengages from the mating connector 150. The extender 260 transmits a component of this force to the adaptive release member 240. The adaptive release member 240 in turn transmits a component of this force to the guides 242 and to the release members 246. Accordingly, the release members 246 cooperate with the extending members 226 to compress the lever 222 until each of the latches 224 are aligned between the respective top rail 170 and bottom rail 180. The leading edge of each latch 224 then crosses the interface between the respective top rail 170 and bottom rail 180, freeing the lever 222 from the traps 190. In this position, the top rail 170 and the bottom rail 180 compresses the lever 222, and the latching connector 216 is said to be disengaged from the mating connector 150. The force guides the latching connector 216 outside of the mating connector 150. In this disengaged position, the transmission medium 212 can be protected by folding the extender 260 over and plugging the dust cover 272 in the cavity between the transmission medium 212 and the housing inner surface 214.

Referring to FIG. 5, the couplers 120 are engaged with an array of cable assemblies 200. The push-pull cable assembly 100 permits the spacing of couplers 120 to be in close proximity to each other.

Referring to FIGS. 6A and 6B, a multi-port push-pull cable assembly 300 can generally include a multi-port cable assembly 310, an adaptive release member 340, and an extender 360.

The multi-port cable assembly 310 includes a plurality of cable assemblies 310a and 310b. Cable assemblies 310a and 310b each can generally include a latching connector 316, a transmission medium 312, and a jacket 318. The latching connector 316 includes an outer housing 320, an inner housing 314, a lever 322, front stops 328, and rear stops 330. The transmission medium 312 is concentrically disposed within the inner housing 314 and the jacket 318. The transmission medium 312 can comprise an optical fiber or an electrical conductor. A first end of the lever 322 is attached to the outer housing 320. A second end of the lever 322 is not attached to the outer housing 320. The lever includes latches 324 and an extending member 326 for extending the lever 322. The latches 324 are symmetrically attached to and protrude from both sides of the lever 322. The extending member 326 is attached to the second end of the lever 322, and comprises a loop. Front stops 328 and rear stops 330 are attached to and protrude from the outer housing 320, and are symmetrically disposed along both sides of the outer housing 320.

The adaptive release member 340 can generally include and is attached to guides 342a and 342b, a plurality of releases 352, a tab 348, and snap bearings 350. Each guide 342a is symmetrically disposed on the adaptive release member 340, protruding downwardly from the adaptive release member 340 bottom surface for a length that is approximately equal to the height of the outer housing 320, and curves inwardly towards the center of adaptive release member 340. The guide 342b is disposed between guides 342a, protruding downwardly from the adaptive release member 340 bottom surface for a length that is approximately equal to the height of the outer housing 320, and forking outwardly towards the sides of adaptive release member 340. Each release 352 includes a lever space 344 that is generally sufficiently wide enough to accommodate the width of the extending member 326. Each release 352 also includes and is attached to symmetrical release members 346. Each of the release members 346 protrude inwardly into the respective lever space 344, collectively forming a channel that is narrower than the width of the extending member 326. The tab 348 protrudes from the top surface of the adaptive release member 340. The snap bearings 350 are symmetrically disposed on both sides of the adaptive release member 340.

The extender 360 includes and is attached to an actuator 361, ridges 366, jacket clamps 374, and dust covers 372. The actuator 361 includes a slot 362 and snaps 364. The slot 362 is sized to cooperate with the tab 348. The snaps 364 protrude symmetrically on each side of the extender 360 and are sized to cooperate with the snap bearings 350. Each ridge 366 protrudes downwardly from the bottom side of the extender 360. A groove 368 is disposed in between each pair of successive ridges 366. Each dust cover bearing 370 is appropriately sized to cooperate with the respective dust cover 372. Each dust cover 372 has an outer diameter that is appropriately sized to fit inside the housing inner surface 314, and includes a cavity 376 which is appropriately sized to accommodate the diameter of the transmission medium 312. Each dust cover 372 base is attached to a pair of lips 378. The lips 378 protrude outwardly along the circumference of each dust cover 372. The lips 378 are appropriately spaced to cooperate with the dust cover bearing 370 thickness. Each jacket clamp 374 is appropriately sized to accommodate the diameter of the jacket 318.

The inner and outer housings 314 and 320 are configured to engage with a mating connector 150 along a coupling direction 206. Each transmission medium 312 acts as a conduit to carry a signal over a distance spanning the length of the transmission medium 312. Each jacket 318 protects the respective optical fiber 312 from damage during operation. Each lever 322 is configured to receive a force in a direction normal to the top of the outer housing 320 and to transmit a proportionate force acting in the same direction to the respective latches 324, thereby selectively disengaging the latching connector 316 from the mating connector 150.

The adaptive release member 340 is configured to receive a force opposite to the coupling direction 206, and to disengage the latching connector 316 from the mating connector 150 by transmitting a component of the received force to the latching connector 316. The release members 346 cooperate with the extending members 326 to compress the lever 322. Each lever space 344 provides a resting space for the lever 322. The guides 342a and 342b cooperate with the outer housing 320, front stops 328 and rear stops 330 in order to restrict the release 352 range of motion to the coupling axis 205 of the latching connector 316 and to further restrict the adaptive release member 340 range of motion to the space between front stops 328 and the rear stops 330. The tab 348 and the snap bearings 350 mechanically couple with corresponding structures of the slot 362 and the snaps 364. The snap bearings 350 cooperate with the snaps 364 to provide freedom for the extender 360 to move in the direction normal to the coupling axis 205.

While the extending members 326 comprises loops in this particular design, it should be understood that the extending members 326 can comprise any other shape which cooperates the releases 352 to compress the levers 322.

The extender 360 includes an actuator 361 that is configured to receive a force that is opposite to the coupling direction 206, and to transmit a component of the received force to the adaptive release member 340. The ridges 366 and the grooves 368 provide enhanced flexibility along the length of the extender 360. Each jacket clamp 374 is configured to clamp the jacket 318 and to prevent the extender 360 from dangling. Each dust cover bearing 370 receives and holds the respective dust cover 372 in place. Each dust cover 372 plugs the cavity between the transmission medium 312 and the housing inner surface 314, thus protecting the transmission medium 312 when it is not in use.

Figure 8:
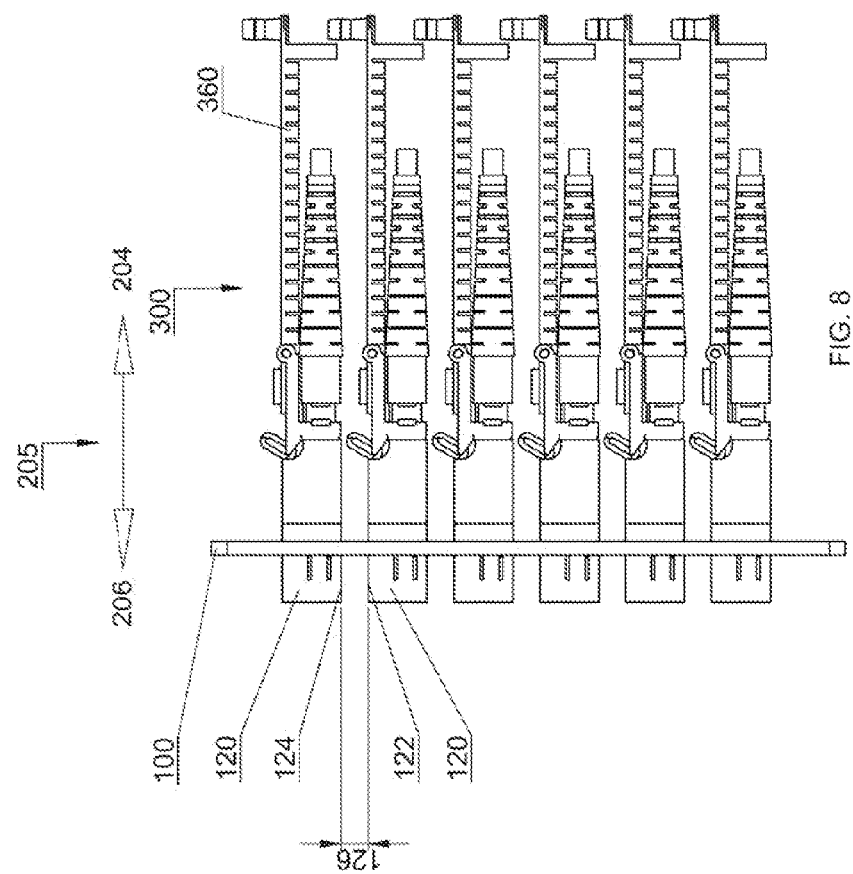
FIG. 8 is a perspective view depicting the engagement of an array of cable assemblies.

Referring to FIG. 8, a high density panel 100 includes a plurality of couplers 120, arranged in close proximity with each other in a plurality of rows and columns, and engaged with plurality of multi-port push-pull cable assemblies 300.

Generally, the latching mechanisms of the multi-port push-pull cable assembly 300 shares many similarities with the latching mechanism of the single port push-pull cable assembly 200 of FIG. 4. More specifically, an operator may engage the multi-port push-pull cable assembly 300 by aligning the multi-port push-pull cable assembly 300 with the mating connectors 150 and applying a force in the coupling direction 206 until the multi-port push-pull cable assembly 400 engages with the mating connectors 150.

Referring to FIGS. 9A and 9B, an extender may have an adjustable length. A push-pull cable assembly 400 can generally include a cable assembly 210, an adaptive release member 240, and an adjustable length extender 460 according to an embodiment.

The adjustable length extender 460 includes and is attached to a plurality of links 462, and an end link 466. Each link 462 is attached to and includes an actuator 461 and snap bearings 450. The actuator 461 includes snaps 464. A plurality of snaps 464 are disposed on a first edge of each link 462, protruding symmetrically on each side of the link 462. A plurality of snap bearings 450 are disposed on a first edge of each link 462, and are symmetrically disposed on each side of the link 462. The snap bearings 450 of each link 462 are sized to cooperate with the snaps 464 of the adjacent link 462 in the chain. The end link 466 includes and is attached to a jacket clamp 474 and a dust cover 472. The end link 466 also includes a dust cover bearing 470 that is appropriately sized to cooperate with the dust cover 472. The dust cover 472 has an outer diameter that is appropriately sized to fit inside the housing inner surface 114, and includes a cavity 476 which is appropriately sized to accommodate the diameter of the transmission medium 112. The dust cover 472 base is attached to a pair of lips 478. The lips 478 protrude outwardly along the circumference of dust cover 472. The lips 478 are appropriately spaced to cooperate with the dust cover bearing 470 thickness. The jacket clamp 474 is appropriately sized to accommodate the diameter of the jacket 118.

The links 462 are configured to adjust the length of the extender 460 by adding or removing links 462 from the chain. Each link 462 is configured to attach to an adjacent link 462, the adaptive release member 240, or the end link 466. The extender 460 includes an actuator that is configured to receive a force that is opposite to the coupling direction 206, and transmit a component of the received force to the adaptive release member 340. The jacket clamp 474 is configured to clamp the jacket 218 and to prevent the extender 460 from dangling. The dust cover bearing 470 receives and holds the dust cover 472 in place. The dust cover 472 is configured to plug the cavity between the transmission medium 212 and the housing inner surface 214, thus protecting the transmission medium 212 when it is not in use.

Referring to FIG. 10, a high density panel 100 includes a plurality of couplers 120, arranged in close proximity with each other in a plurality of rows and columns, and engaged with plurality of push-pull cable assemblies 400. The latching mechanisms of the push-pull cable assembly 400 shares many similarities with the latching mechanism of the push-pull cable assembly 200 of FIG. 4. More specifically, an operator may engage the push-pull cable assembly 400 by aligning the push-pull cable assembly 400 with the mating connectors 150 and applying a force in the coupling direction 206 until the push-pull cable assembly 400 engages with the mating connectors 150.

The push-pull cable assembly 400 can be disengaged from the mating connector 150 by applying a force that is opposite to the coupling direction 206 to the extender 460 until the multi-port push-pull cable assembly 400 disengages from each mating connector 150.

Referring to FIGS. 11A and 11B, the extender 560 of a multi-port push-pull cable assembly 500 has an adjustable length. The multi-port push-pull cable assembly can generally include a multi-port cable assembly 310, an adaptive release member 340, and an adjustable extender 560.

The adjustable length extender 560 includes and is attached to a plurality of links 562, and an end link 566. Each link 562 is attached to and includes an actuator 561 and snap bearings 550. The actuator 561 includes snaps 564. A plurality of snaps 564 are disposed on a first edge of each link 562, protruding symmetrically on each side of the link 562. A plurality of snap bearings 550 are disposed on a first edge of each link 562, and are symmetrically disposed on each side of the link 562. The snap bearings 550 of each link 562 are sized to cooperate with the snaps 564 of the adjacent link 562 in the chain. The end link 566 includes and is attached to a plurality of jacket clamps 574 and a plurality of dust covers 572. The end link 566 also includes a plurality of dust cover bearings 570 that are appropriately sized to cooperate with the dust cover 472. Each dust cover 572 has an outer diameter that is appropriately sized to fit inside the housing inner surface 314, and includes a cavity 576 which is appropriately sized to accommodate the diameter of the transmission medium 312. Each dust cover 572 base is attached to a pair of lips 578. The lips 578 protrude outwardly along the circumference of each dust cover 572. The lips 578 are appropriately spaced to cooperate with each dust cover bearing 570 thickness. The jacket clamp 574 is appropriately sized to accommodate the diameter of the jacket 318.

The links 562 are configured to adjust the length of the extender 560 by adding or removing links 562 from the chain. Each link 562 attaches to an adjacent link 562, the adaptive release member 340, or the end link 566. The extender 560 is configured to receive a force that is opposite to the coupling direction 206, and to transmit the received force to the adaptive release member 340. The jacket clamp 574 is configured to clamp the jacket 318 and to prevent the extender 560 from dangling. The dust cover bearing 570 is configured to receive and hold the dust cover 572 in place. The dust cover 572 is configured to plug the cavity in between the transmission medium 312 and the housing inner surface 314, thus protecting the transmission medium 312 when it is not in use.

Referring to FIG. 12, a high density panel 100 includes a plurality of couplers 120, arranged in close proximity with each other in a plurality of rows and columns, and engaged with plurality of multi-port push-pull cable assemblies 500. The latching mechanisms of the multi-port push-pull cable assembly 500 shares many similarities with the latching mechanism of the single port push-pull cable assembly 200 of FIG. 4. More specifically, an operator may engage the multi-port push-pull cable assembly 500 by aligning the multi-port push-pull cable assembly 500 with the mating connectors 150 and applying a force in the coupling direction 206 until the multi-port push-pull cable assembly 500 engages with the mating connectors 150.

The multi-port push-pull cable assembly 500 can be disengaged from the mating connectors 150 by applying a force that is opposite to the coupling direction 206 to the extender 560 until the multi-port push-pull cable assembly 500 disengages from each mating connector 150.

Figure 13:
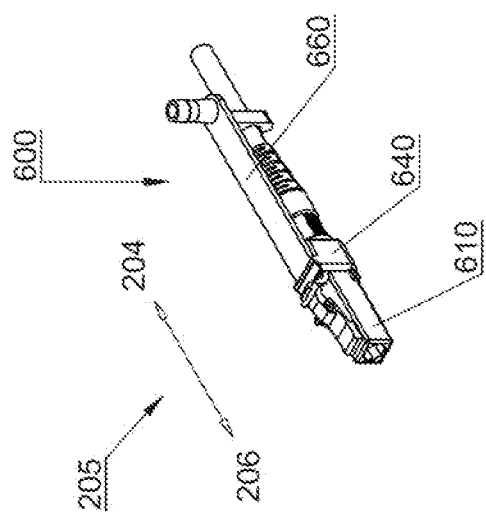
FIG. 13 is an isometric view of a cable assembly for interconnection on a high density mating connector panel.

Referring to FIG. 13, a low-profile push-pull cable assembly 600 can generally include a cable assembly 610, a guide 640, and an extender 660.

Figure 14:
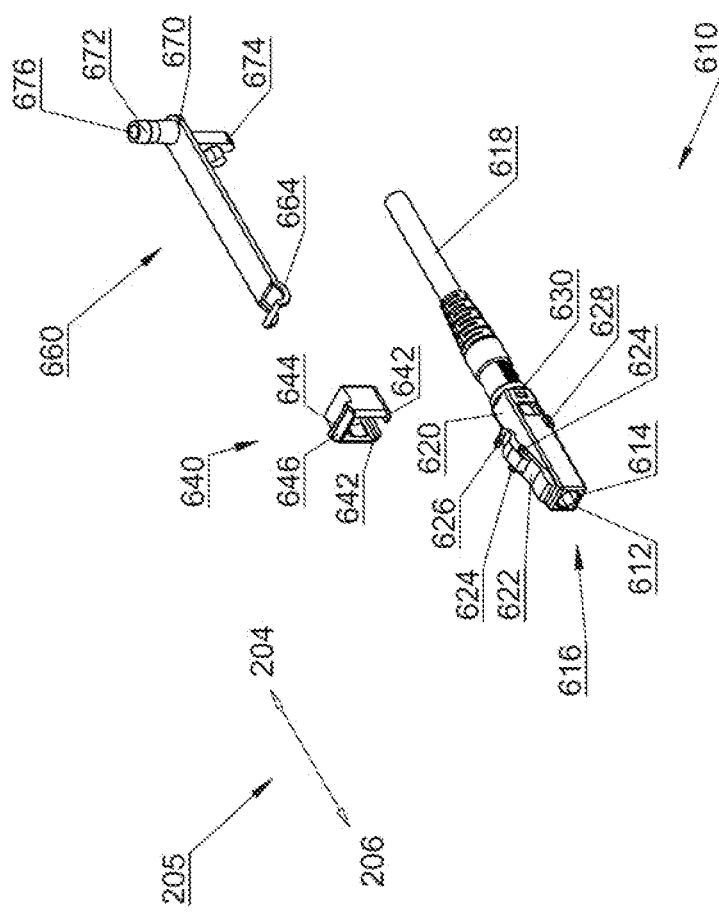
FIG. 14 is an exploded view of the cable assembly of FIG. 13.

Referring to FIG. 14, the cable assembly 610 generally includes a latching connector 616, a transmission medium 612, and a jacket 618. The latching connector 616 can generally include an outer housing 620, an inner housing 614, a lever 622, front stops 628, and rear stops 630. The transmission medium 612 is concentrically disposed within the inner housing 614 and the jacket 618. The transmission medium 612 can comprise an optical fiber or an electrical conductor. A first end of the lever 622 is attached to the outer housing 620. A second end of the lever 622 is not attached to the outer housing 620. The lever 622 includes latches 624 and an extending member 626 for extending the lever 622. The latches 624 are symmetrically attached to and protrude from both sides of the lever 622. The extending member 626 is attached to the end of the lever 622, and comprises a hook. Front stops 628 and rear stops 630 are attached to and protrude from the outer housing 620, and are symmetrically disposed along both sides of the outer housing 620.

The guide 640 can generally include and is attached to sidewalls 642, and an aperture 644. Each sidewall 642 is symmetrically disposed on the guide 640, protruding downwardly from the guide 640 bottom surface for a length that is approximately equal to the height of outer housing 620, and curves inwardly towards the center of guide 640. The aperture 644 protrudes upwardly from the top surface of the guide 640.

The extender 660 includes and is attached to an actuator 664, a jacket clamp 674, and a dust cover 672. The dust cover 672 has an outer diameter that is appropriately sized to fit inside the housing inner surface 614, and includes a cavity 676 which is appropriately sized to accommodate the diameter of the transmission medium 612. The jacket clamp 674 is appropriately sized to accommodate the diameter of the jacket 618. As shown in FIG. 14, the actuator 664 has a curvature. The actuator 664 may also be flat, or have a curvature that is different than what is shown in FIG. 14.

The inner and outer housings 614 and 620 are configured to engage with a mating connector 150 along a coupling direction 206. The transmission medium 612 acts as a conduit to carry a signal over a distance spanning the length of the transmission medium 612. The jacket 618 protects the transmission medium 612 from damage during operation. The lever 622 is configured to receive a force in a direction normal to the top of the outer housing 620 and to transmit a proportionate force acting in the same direction to the latches 624, thereby selectively disengaging the latching connector 616 from the mating connector 150.

The guide 640 sidewalls 642 are configured to cooperate with the outer housing 620, front stops 628 and rear stops 630 in order to restrict the extender range of motion to the coupling axis 205 of the latching connector 616 and to further restrict the guide 640 range of motion to the space between front stops 628 and the rear stops 630. The aperture 644 is configured to cooperate with the sidewalls 642 and the latching connector 616 to restrict the extender 660 range of motion to the coupling axis 205.

The extender 660 includes an actuator 664 that is configured to receive a force that is opposite to the coupling direction 206, and to transmit a component of the received force to the extending member 626, thereby causing a compression of the lever 622. The jacket clamp 674 is configured to clamp the jacket 618 and to prevent the extender 660 from dangling. The dust cover 672 is configured to plug the cavity in between the transmission medium 612 and the housing inner surface 614, thus protecting the transmission medium 612 when it is not in use.

Figure 15:
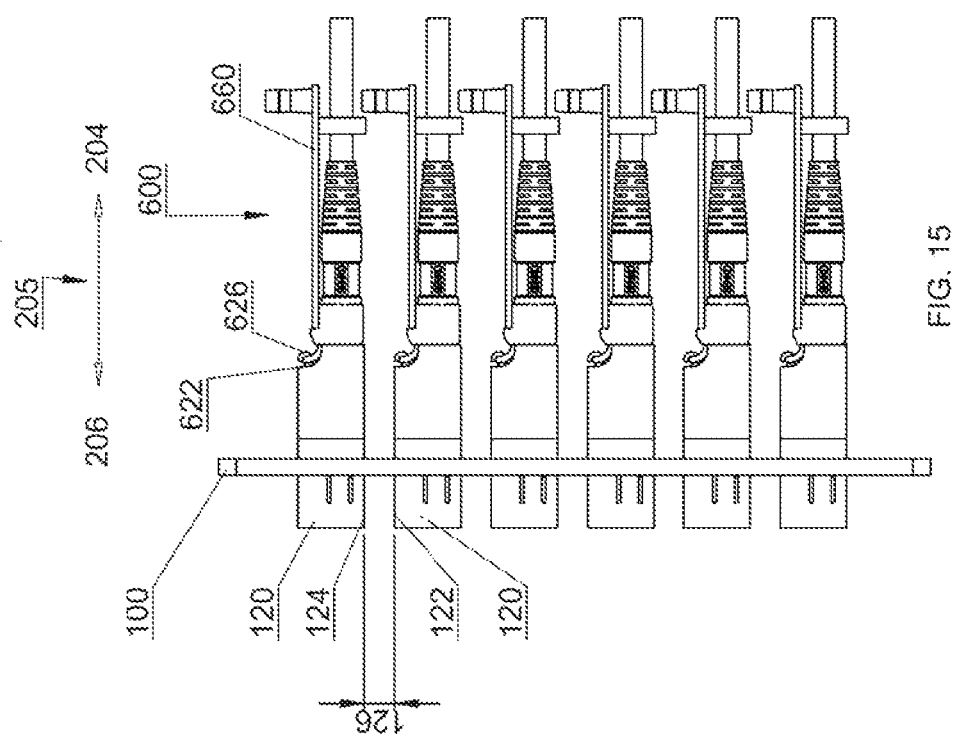
FIG. 15 is a perspective view depicting the engagement of an array of cable assemblies.
Figure 16:
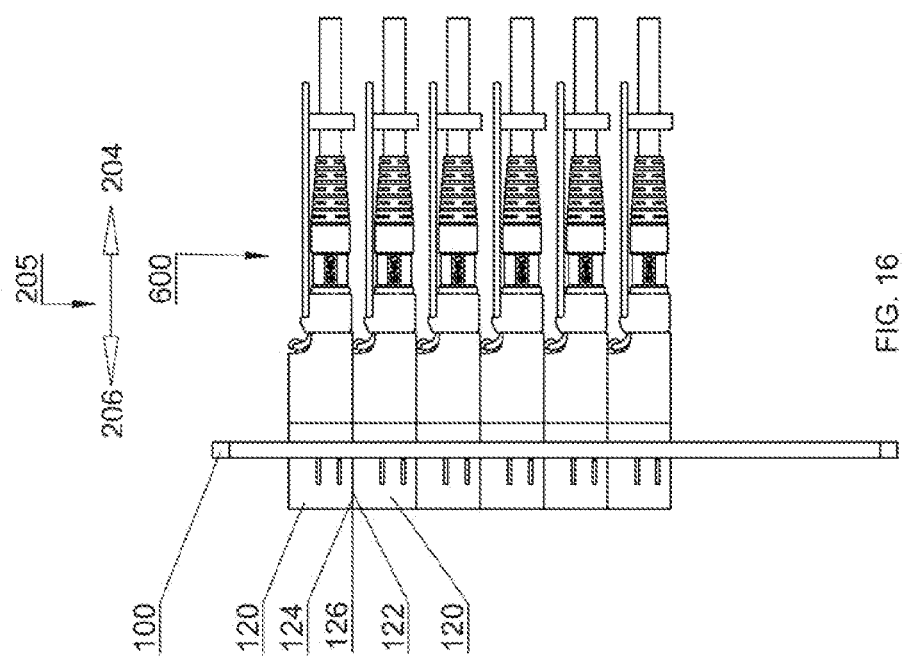
FIG. 16 is a perspective view depicting the stackability of the couplers of FIG. 3A.

Referring to FIGS. 15 and 16, a high density panel 100 includes a mounting surface 110. A plurality of couplers 120, are disposed on the mounting surface 110, and arranged generally in close proximity to one another in a plurality of rows and columns. The plurality of couplers 120 are engaged with plurality of push-pull cable assemblies 600. Each coupler 120 has a first edge 122 and a second edge 124. It is illustrated that the distance 126 between a first edge 122 of a first coupler 120 and the second edge 124 of a second coupler 120, generally with no or with a substantially small spacing that is less than 1.25 millimeters between the adjacent couplers. The couplers 120 can also be configured to engage with a LC connector.

Figure 17:
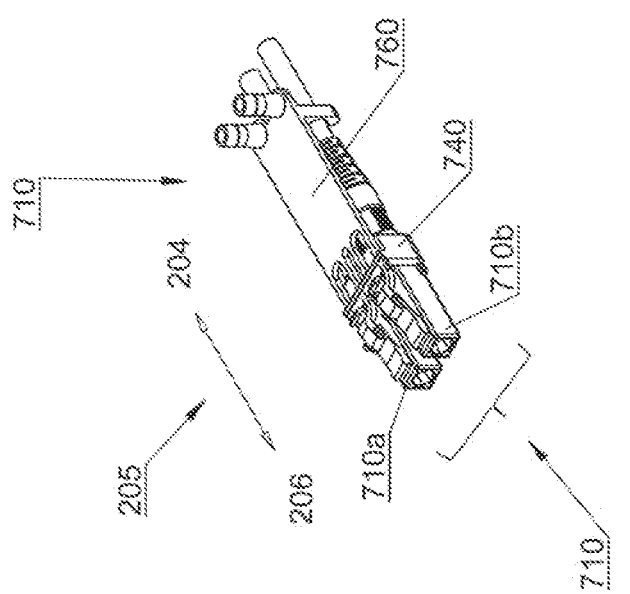
FIG. 17 is an isometric view of a multi-port cable assembly for interconnection on a high density mating connector panel.

Referring to FIG. 17, a multi-port push-pull cable assembly 700 can generally include a multi-port cable assembly 710, a guide 740, and an extender 760.

Figure 18:
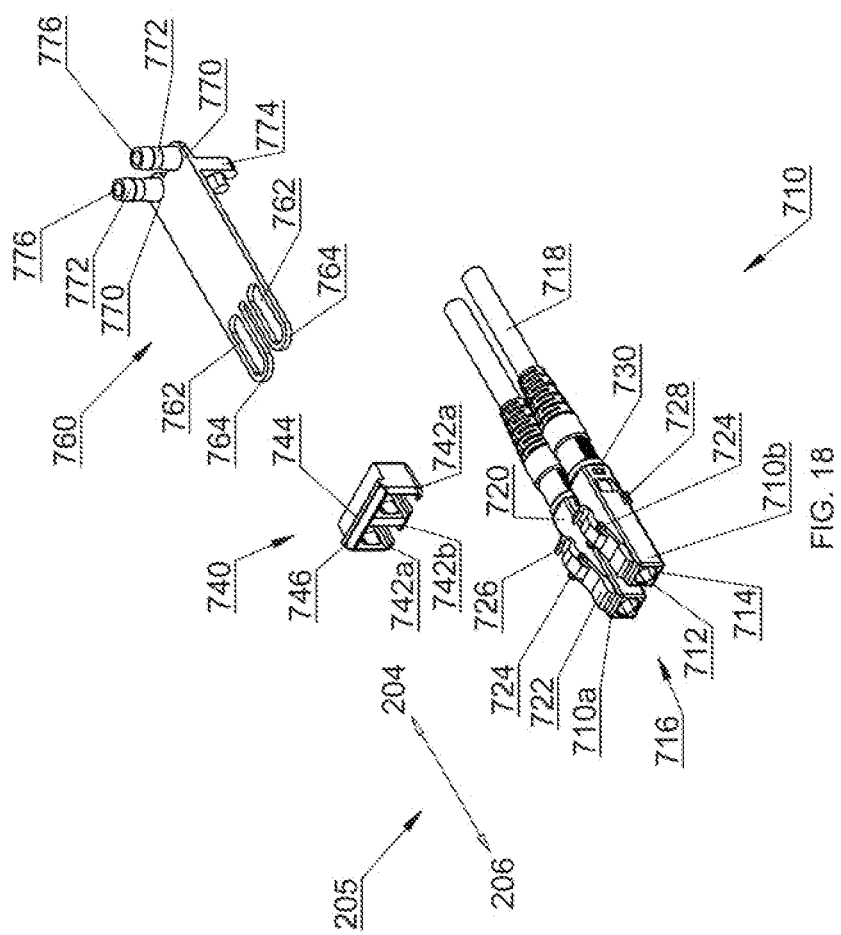
FIG. 18 is an exploded view of the cable assembly of FIG. 17.

Referring to FIG. 18, the multi-port cable assembly 710 includes a plurality of cable assemblies 710a and 710b. Cable assemblies 710a and 710b each can generally include a latching connector 716, a transmission medium 712, and a jacket 718. The latching connector 716 can generally include an outer housing 720, an inner housing 714, a lever 722, front stops 728, and rear stops 730. The transmission medium 712 is concentrically disposed within the inner housing 714 and the jacket 718. The transmission medium 712 can comprise an optical fiber or an electrical conductor. A first end of the lever 722 is attached to the outer housing 720. A second end of the lever 722 is not attached to the outer housing 720. The lever 722 includes latches 724 and an extending member 726 for extending the lever 722. The latches 724 are symmetrically attached to and protrude from both sides of the lever 722. The extending member 726 is attached to the end of the lever 722, and comprises a hook. Front stops 728 and rear stops 730 are attached to and protrude from the outer housing 720, and are symmetrically disposed along both sides of the outer housing 720.

The guide 740 can generally include and is attached to sidewalls 742*a* and 742*b*, and an aperture 744. Each sidewall 742*a* is symmetrically disposed on the guide 740, protruding downwardly from the guide 740 bottom surface for a length that is approximately equal to the height of outer housing 720, and curves inwardly towards the center of guide 740. The sidewall 742*b* is disposed between sidewalls 742*a*, protruding downwardly from the guide 740 bottom surface for a length that is approximately equal to the height of outer housing 720, and forking outwardly towards the sides of the guide 740. The aperture 744 protrudes upwardly from the top surface of the guide 740.

The extender 760 includes and is attached to a plurality of actuators 764, a plurality of jacket clamps 774, and a plurality of dust covers 772. Each dust cover 772 has an outer diameter that is appropriately sized to fit inside the housing inner surface 714, and includes a cavity 776 which is appropriately sized to accommodate the diameter of The transmission medium 712. Each jacket clamp 774 is appropriately sized to accommodate the diameter of the jacket 718. As shown in FIG. 18, the actuators 764 are flat, however the actuators 764 may also have a curvature.

The inner and outer housings 714 and 720 are configured to engage with a mating connector 150 along a coupling direction 206. Each transmission medium 712 acts as a conduit to carry a signal over a distance spanning the length of the transmission medium 712. Each jacket 718 protects the respective optical fiber 712 from damage during operation. Each lever 722 is configured to receive a force in a direction normal to the top of the outer housing 720 and to transmit a proportionate force acting in the same direction to the respective latches 724, thereby selectively disengaging the latching connector 716 from the mating connector 150.

The guide 740 sidewalls 742*a* and 742*b* are configured to cooperate with the outer housing 720, front stops 728 and rear stops 730 in order to restrict the extender 760 range of motion to the coupling axis 205 of the latching connector 716 and to further restrict the guide 740 range of motion to the space between front stops 728 and the rear stops 730. The aperture 744 is configured to cooperate with the sidewalls 742 and the latching connector 716 to restrict the extender 760 range of motion to the coupling axis 205.

The extender 760 includes actuators 764 that are configured to receive a force that is opposite to the coupling direction 206, and to transmit a component of the received force to each extending member 726. Each jacket clamp 774 is configured to clamp the jacket 718 and to prevent the extender 760 from dangling. Each dust cover 772 is configured to plug the cavity in between The transmission medium 712 and the housing inner surface 714, thus protecting The transmission medium 712 when it is not in use.

Figure 19:
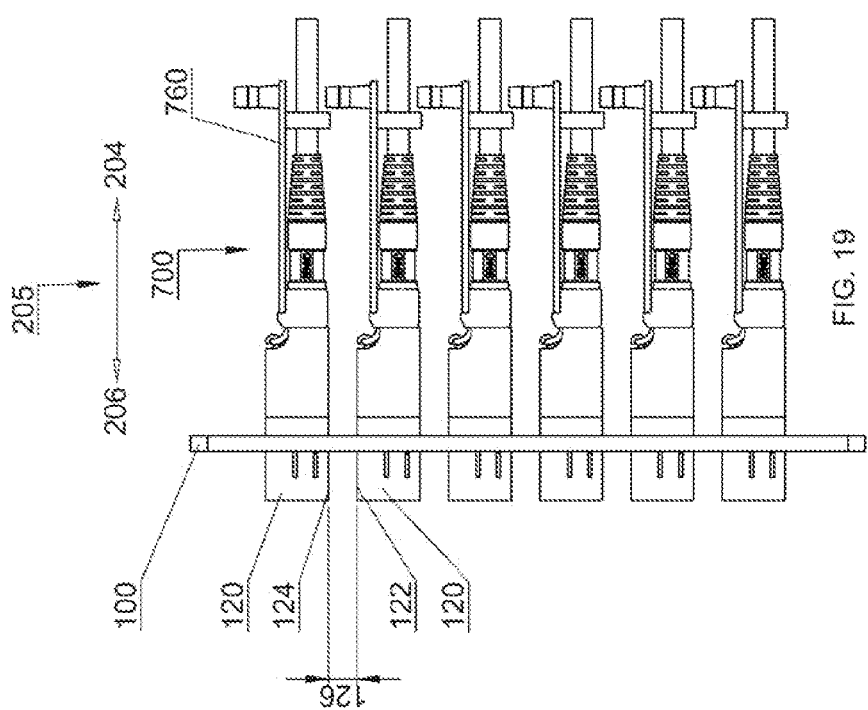
FIG. 19 is a perspective view depicting the engagement of an array of cable assemblies.
Figure 20:
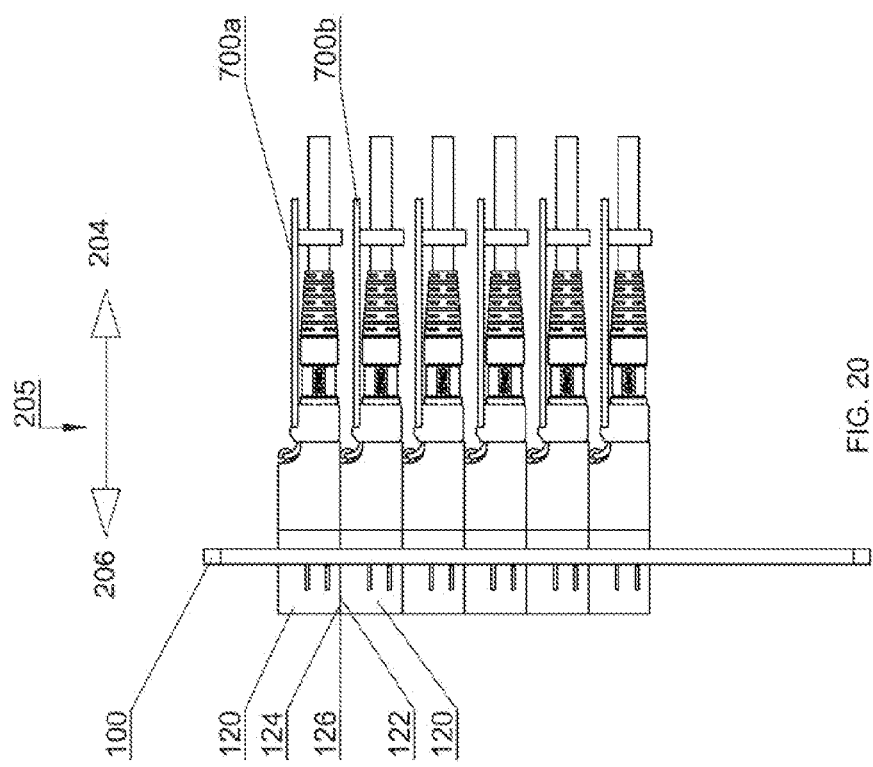
FIG. 20 is a perspective view depicting the stackability of the couplers of FIG. 3A.

Referring to FIGS. 19-20, a high density panel 100 includes a mounting surface 110. A plurality of couplers 120, are disposed on the mounting surface 110, and arranged generally in close proximity to one another in a plurality of rows and columns. The plurality of couplers 120 are engaged with plurality of push-pull cable assemblies 700. Each coupler 120 has a first edge 122 and a second edge 124. It is illustrated that the distance 126 between a first edge 122 of a first coupler 120 and the second edge 124 of a second coupler 120, generally with no or with a substantially small spacing that is less than 1.25 millimeters between the adjacent couplers. The couplers 120 can also be configured to engage with a LC connector.

Figure 21:
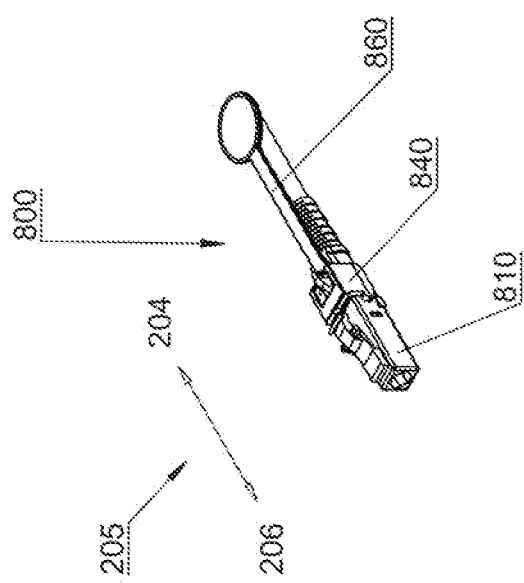
FIG. 21 is an isometric view of a cable assembly for interconnection on a high density mating connector panel.

Referring to FIG. 21, a low-profile push-pull cable assembly 800 can generally include a cable assembly 810, a boot 840, and an extender 860.

Figure 22:
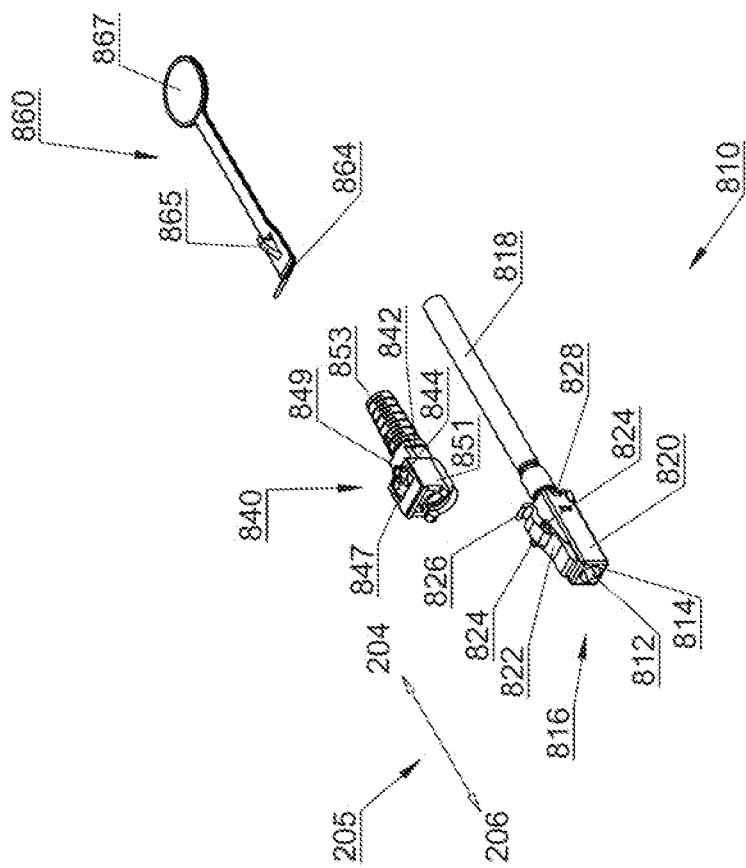
FIG. 22 is an exploded view of the cable assembly of FIG. 21.

Referring to FIG. 22, the cable assembly 810 generally includes a latching connector 816, a transmission medium 812, a jacket 818, and a trap 828. The latching connector 816 can generally include an outer housing 820, an inner housing 814, a lever 822. The transmission medium 812 is concentrically disposed within the inner housing 814 and the jacket 818. The transmission medium 812 can comprise an optical fiber or an electrical conductor. A first end of the lever 822 is attached to the outer housing 820. A second end of the lever 822 is not attached to the outer housing 820. The lever 822 includes latches 824 and an extending member 826 for extending the lever 822. The latches 824 are symmetrically attached to and protrude from both sides of the lever 822. The extending member 826 is attached to the end of the lever 822, and comprises a hook. The trap 828 is disposed in between the latching connector 816 and the jacket 818.

The boot 840 can generally include and is attached to a strain relief 842, a passageway 844, a stop space 847, a restoring member 849, a protruding member 851, and a flexible membrane 853. The strain relief 842 is sized to cover a distance of the transmission medium 812 entering into the latching connector 816. The passageway 844 runs parallel to the coupling axis 205 along the top of the boot 840. The stop space 847 is disposed along the passageway 844, and is connected to a restoring member 849. The restoring member 849 protrudes outwardly from the stop space 847 in a direction opposite to the coupling direction 206. The flexible membrane is sized to fit around the jacket 818. The protruding member 851 is disposed on the inner surface of the strain relief 842.

The extender 860 includes and is attached to an actuator 864, a stop 865, and an identification tag 867. The actuator is sized to cooperate with the extending member 826, and comprises a loop. The stop 865 protrudes from the extender 860 top surface and is sized to cooperate with the stop space 847 and the restoring member 849. As shown in the figure, the stop 856 comprises a dorsal fin. The extender 860 width and height is sized to cooperate with the width and height of the passageway 844 width and height. The identification tag 867 is sized to accommodate the dimensions of user defined identifications.

Figure 23:
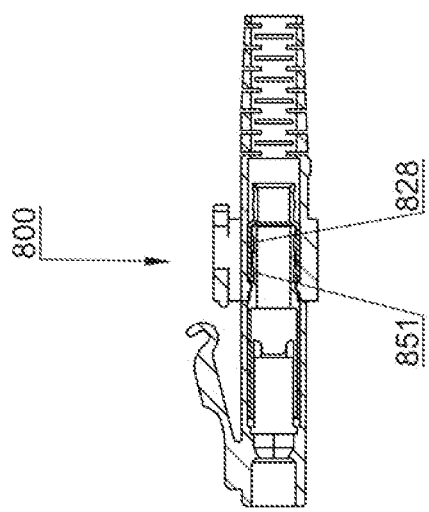
FIG. 23 is a cross sectional view of the cable assembly of FIG. 21.

The inner and outer housings 814 and 820 are configured to engage with a mating connector 150 along a coupling direction 206. The transmission medium 812 acts as a conduit to carry a signal over a distance spanning the length of the transmission medium 812. The jacket 818 protects the transmission medium 812 from damage during operation. The lever 822 is configured to receive a force in a direction normal to the top of the outer housing 820 and to transmit a proportionate force acting in the same direction to the latches 824, thereby selectively disengaging the latching connector 816 from the mating connector 150. Referring to FIG. 23, the trap 828 is configured to cooperate with the protruding member 851. The trap 828 is configured to cooperate with the protruding member 851 to restrict the movement of the boot 840 along the coupling axis 205.

The strain relief 842 is configured to protect the transmission medium 812 from flexure near the area of termination. The protruding member 851 is configured to cooperate with the trap 828 to restrict the movement of the boot 840 along the coupling axis. The passageway 844 is configured to accept the extender 860. The stop space 847 is configured to provide a resting place for the stop 865 when the lever 822 is in the natural position. The restoring member 849 is configured to overcome the friction between the extender 860 surfaces and the inner walls of the passageway 844 in order to restore the lever 822 to the natural position. The flexible membrane 853 is configured to provide a flexible transition in between the cable 818 and the strain relief 842.

The extender 860 includes an actuator 864 that is configured to receive a force that is opposite to the coupling direction 206, and to transmit a component of the received force to the extending member 826, thereby causing a compression of the lever 822. The stop 865 is configured to cooperate with the restoring member 849 to overcome the friction between the extender 860 surfaces and the inner walls of the passageway 844 in order to restore the lever 822 to the natural position following the application of a user-applied force to the extender 860 opposite to the coupling direction 206. The identification tag 867 is configured to provide a customizable area for display of a user-defined identification of the cable assembly.

Referring to FIG. 24 a high density panel 100 includes a mounting surface 110. A plurality of couplers 120, are disposed on the mounting surface 110, and arranged generally in close proximity to one another in a plurality of rows and columns. The plurality of couplers 120 are engaged with plurality of push-pull cable assemblies 800. Each coupler 120 has a first edge 122 and a second edge 124. It is illustrated that the distance 126 between a first edge 122 of a first coupler 120 and the second edge 124 of a second coupler 120, generally with no or with a substantially small spacing that is less than 1.25 millimeters between the adjacent couplers. The couplers 120 can also be configured to engage with a LC connector.

The cable assemblies as taught herein reduces the support cost and enhances the quality of service of using high-density panels in communication systems. Additionally, depending on the design of the snap features and associated snap receiving recesses, the adaptive release member and/or extender may be disassembled to replace a worn part (e.g., if a link breaks or wears out) or otherwise repair the adaptive release member and/or extender. Additionally, the low-profile of the cable assemblies taught herein permits system integrators to eliminate the spacing between mating connectors on a high-density panel.

The various components described above may be constructed by manufacturing methods well known in the art. Materials for use in construction of the various components listed above may include various polymers, plastics, metals, glass, and other similar suitable materials. For example, the adaptive release members, latching connectors, and extenders may be manufactured via a plastic injection molding process. Alternatively, the various adaptive release members, latching connectors, and extenders may be manufactured from a suitable metal via a milling process. Additional materials and manufacturing methods will be well known to those skilled in the art.

The above examples are not intended to limit the invention, but merely to serve as an illustration of how the invention might be constructed and operated.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A latching connector comprising a housing configured to engage with a mating connector along a coupling axis, the housing including:
    a lever configured to engage with the mating connector to engage and selectively disengage the latching connector with the mating connector; and
    an extender removably connected with the housing and comprising a portion for contacting the lever to disengage the lever from the mating connector to disengage the latching connector from the mating connector.

2. The latching connector of claim 1, wherein the portion for contacting the lever comprises a hook for engaging the lever.

3. The latching connector of claim 1, wherein the portion for contacting the lever comprises a loop for engaging the lever.

4. The latching connector of claim 1, wherein the latching connector comprises a multi-port connector comprising at least two housings, wherein each of the at least two housings comprises a lever, and the portion for contacting is configured to disengage each of the levers from the mating connector.

5. The latching connector of claim 1, wherein the latching connector is an LC connector.

6. An adaptive release member for selectively actuating disengagement of a latching connector from a mating connector,
    the latching connector comprising a housing configured to engage with a mating connector along the coupling direction, the housing including a lever connected to the housing, the lever configured to selectively disengage the latching connector from the mating connector, and the adaptive release member comprising:
    a connection portion for removably attaching the adaptive release member to the latching connector housing; and
    a release configured to receive a first force opposite to the latching connector coupling direction and transmit a component of the first force to a lever to actuate the lever and disengage the latching connector from the mating connector.

7. The adaptive release member of claim 6, wherein the latching connector is a multi-port latching connector comprising at least two housings, wherein each of the at least two housings comprises a lever, and the release is configured to transmit the component of the first force to each of the levers to actuate each of the levers.

8. An extender for selectively disengaging a latching connector from a mating connector, the latching connector comprising a housing configured to engage with the mating connector along a coupling direction, and the housing comprising a lever configured to engage with the mating connector to engage and selectively disengage the latching connector and the mating connector, the extender comprising:
    a connection for removably attaching the extender to the housing; and an actuator configured to receive a first force opposite to the latching connector coupling direction, and to disengage the latching connector from the mating connector by transmitting a component of the first force to the lever to disengage the lever from the mating connector to disengage the latching connector from the mating connector.

9. The extender of claim 8, wherein the lever comprises one of a hook and a loop.

10. The extender of claim 9, wherein the actuator comprises the other of a hook and a loop for engaging with the lever to transmit the component of the first force from the actuator to the lever.

11. The extender of claim 10, wherein the extender further includes a plurality of ridges and grooves disposed along a length of the extender.

12. The extender of claim 10, further including a dust cover attached to the extender and configured to protect a transmission medium.

13. The extender of claim 10, further including a jacket clamp attached to the extender.

14. The extender of claim 10, wherein at least one link is connected to the actuator to adjust a length of the extender.

15. The extender of claim 10, further including an identification tag connected to the extender.

16. An extender comprising:
an actuator configured to receive a first force, the first force opposite to a latching connector coupling direction, and to transmit a component of the first force to an adaptive release member, the adaptive release member including:
a release configured to receive a component of the first force and to disengage the latching connector from the mating connector by transmitting a second force to the latching connector, the latching connector comprising:
a housing configured to engage with a mating connector along the coupling direction, the housing including:
a lever connected to the housing, the lever configured to selectively disengage the latching connector from the mating connector, and
an extending member connected to the lever and configured to cooperate with the release to actuate the lever; and
a guide connected to the release and configured to cooperate with the latching connector to restrict the release range of motion.

17. The extender of claim 16, wherein the extender further includes a plurality of ridges and grooves disposed along a length of the extender.

18. The extender of claim 16, wherein a link is connected to the actuator, the link configured to adjust a length of the extender.

19. The extender of claim 16, further including a dust cover attached to the extender and configured to protect a transmission medium.

20. The extender of claim 16, further including a jacket clamp attached to the extender.

21. The extender of claim 16, further comprising an identification tag connected to the extender.

22. A cable assembly comprising:
a jacket;
a latching connector comprising:
a housing configured to engage with a mating connector along a coupling direction, the housing comprising a lever connected to the housing, the lever configured to selectively disengage the latching connector from the mating connector; and
an extender removably attached to the housing and extending a distance from the housing, the extender comprising an actuating portion configured to receive a first force opposite to the coupling direction and transmit a component of the first force to the lever to actuate the lever and disengage the latching connector from the mating connector; and
a transmission medium disposed within the jacket and the housing.

23. The cable assembly of claim 22, wherein the latching connector further comprises a guide positioned on the latching connector, the guide configured to restrict the extender range of motion.

24. The cable assembly of claim 22, wherein the actuating portion comprises an adaptive release member including:
a release configured to receive the first force and transmit the component of the first force to the extending lever; and
a guide connected to the release and configured to cooperate with the housing to restrict the release range of motion.

25. The cable assembly of claim 23, wherein the lever comprises a hook and the actuating portion comprises a loop for engaging with the hook.

26. The cable assembly of claim 23, wherein the transmission medium comprises an optical fiber.

27. The cable assembly of claim 23, wherein the transmission medium comprises an electrical conductor.

28. The cable assembly of claim 23, wherein the latching connector comprises an LC connector, and the mating connector is configured to engage with the LC connector.

29. The cable assembly of claim 23, wherein the extender further includes a plurality of ridges and grooves disposed along a length of the extender.

30. The cable assembly of claim 23, further including a dust cover attached to the extender and configured to protect the transmission medium.

31. The cable assembly of claim 23, further including a jacket clamp attached to the extender.

32. The cable assembly of claim 23, wherein a link is connected to the actuator, the link configured to adjust a length of the extender.

33. The cable assembly of claim 23, further including an identification tag connected to the extender.

34. The cable assembly of claim 23, wherein the guide comprises a boot including a strain relief configured to protect the transmission medium.

35. The cable assembly of claim 24, wherein the extender includes an extending member interconnected with the adaptive release member, the extending member being configured to receive the first force and transmit the first force to the release.

36. The cable assembly of claim 35, wherein the extending member further includes a plurality of ridges and grooves disposed along a length of the extending member.

37. The cable assembly of claim 35, further including a dust cover attached to the extending member and configured to protect the transmission medium.

38. The cable assembly of claim 35, further including a jacket clamp attached to the extending member.

39. The cable assembly of claim 35, wherein the extending member comprises at least one link is connected to the actuator to adjust a length of the extending member.

40. The cable assembly of claim 35, wherein the lever comprises a loop and the release comprises a hook for engaging the loop.

41. The cable assembly of claim 35, further including an identification tag connected to the extending member.

42. The cable assembly of claim 34, further including:
a restoring member connected to the boot; and
a stop connected to the extender and configured to cooperate with the restoring member to restore the position of the lever to a natural position.

43. A high-density panel assembly comprising:
a panel including a mounting surface;
a first mating connector disposed on the mounting surface and having a first edge;
a second mating connector disposed on the mounting surface and having a second edge;
wherein the distance between the first edge and the second edge is less than 1.25 millimeters; and
latching connectors for mating with the mating connectors, the latching connectors each comprising a housing configured to engage with a mating connector along a coupling axis, each housing including:
a lever configured to engage with the mating connector to engage and selectively disengage the latching connector with the mating connector; and
an extender removably connected with the housing and comprising a portion for contacting the lever to disengage the lever from the mating connector to disengage the latching connector from the mating connector.

44. The high-density panel assembly of claim 43, wherein the distance between the first edge and the second edge is greater than or equal to 0 millimeters.

45. The high-density panel assembly of claim 43, wherein the first edge abuts the second edge.

46. The high-density panel assembly of claim 43, wherein the panel comprises a printed circuit board.

47. The high-density panel assembly of claim 43, wherein the latching connector is a LC connector.

48. A method of connecting a latching cable assembly to a panel and extracting the latching cable assembly from the panel, the latching cable assembly comprising a housing, and the housing comprising a lever configured to engage with a mating connector of the panel to engage and disengage the latching assembly and the mating connector, and the method comprising:
removably attaching an extender to the housing, the extender comprising an actuator portion for engaging the lever and configured to transmit a force to the lever;
inserting the latching assembly into the mating connector along a first coupling direction of movement to engage the lever with the mating connector and retain the latching assembly in the panel;
applying a force to the extender along a direction opposite to the coupling direction of the latching assembly; and
transmitting a component of the force to the lever via the actuator portion to disengage the lever from the mating connector and disengage the latching assembly from the mating connector; and
extracting the latching assembly from the panel.

49. The method of claim 48, further comprising replacing the extender of an extracted latching cable assembly by detaching the extender from the housing, and removably attaching a different extender to the housing.

* * * * *